United States Patent
DeLizo et al.

(10) Patent No.: US 12,485,878 B2
(45) Date of Patent: Dec. 2, 2025

(54) SYSTEM AND METHODS FOR AUTONOMOUSLY BACKING A VEHICLE TO A TRAILER

(71) Applicant: PACCAR INC, Bellevue, WA (US)

(72) Inventors: Stan DeLizo, Lynwood, WA (US); Ted Scherzinger, Sammamish, WA (US); Yen-Lin Han, Seattle, WA (US); Austin Chong, Fremont, CA (US); Christian Heussy, Seattle, WA (US); Caroline Hofgaard, Duvall, WA (US); Oleksiy Khomenko, Spokane, WA (US); Pauline Shammami, Seattle, WA (US); Kirstin Schauble, Meadow Vista, CA (US)

(73) Assignee: PACCAR Inc, Bellevue, WA (US)

( * ) Notice: Subject to any disclaimer, the term of this patent is extended or adjusted under 35 U.S.C. 154(b) by 428 days.

(21) Appl. No.: 17/277,065

(22) PCT Filed: Jun. 1, 2018

(86) PCT No.: PCT/US2018/035726
§ 371 (c)(1),
(2) Date: Mar. 17, 2021

(87) PCT Pub. No.: WO2019/231470
PCT Pub. Date: Dec. 5, 2019

(65) Prior Publication Data
US 2022/0048497 A1    Feb. 17, 2022

(51) Int. Cl.
*B60W 30/00* (2006.01)
*B60W 10/04* (2006.01)
(Continued)

(52) U.S. Cl.
CPC ............ *B60W 30/06* (2013.01); *B60W 10/04* (2013.01); *B60W 10/18* (2013.01); *B60W 10/20* (2013.01);
(Continued)

(58) Field of Classification Search
CPC ...... B60W 30/06; B60W 10/04; B60W 10/18; B60W 10/20; B60W 30/18036;
(Continued)

(56) References Cited

U.S. PATENT DOCUMENTS

| 9,238,483 B2 | 1/2016 | Hafner |
| 9,499,018 B2 | 11/2016 | Gehrke |

(Continued)

FOREIGN PATENT DOCUMENTS

| CA | 2873063 | 11/2012 |
| CA | 3036755 | 4/2018 |

(Continued)

OTHER PUBLICATIONS

European Extended Seach Report in Application 18920790.5, mailed Dec. 17, 2021, 8 pages.

(Continued)

*Primary Examiner* — Tiffany P Young
(74) *Attorney, Agent, or Firm* — Merchant & Gould P.C.

(57) ABSTRACT

In some embodiments, techniques are provided for autonomously backing a vehicle (such as a Class 8 truck) to a trailer. In some embodiments, environment sensors such as image sensors and range sensors mounted to the vehicle detect a trailer and determine distances between the trailer and the vehicle as well as relative angles of the trailer and the vehicle. In some embodiments, the vehicle determines a path to the trailer based on this information, and autono- (Continued)

mously controls braking, torque, and/or steering of the vehicle to autonomously back the vehicle along the determined path.

17 Claims, 20 Drawing Sheets

(51) Int. Cl.
  *B60W 10/18*    (2012.01)
  *B60W 10/20*    (2006.01)
  *B60W 30/06*    (2006.01)
  *B60W 30/18*    (2012.01)
  *B60W 50/14*    (2020.01)
  *G05D 1/00*    (2006.01)
  *G06T 7/50*    (2017.01)
  *G06T 7/70*    (2017.01)
  *H04N 7/18*    (2006.01)
  *B60W 60/00*    (2020.01)

(52) U.S. Cl.
  CPC ...... *B60W 30/18036* (2013.01); *B60W 50/14* (2013.01); *G05D 1/0038* (2013.01); *G05D 1/0212* (2013.01); *G05D 1/0251* (2013.01); *G06T 7/50* (2017.01); *G06T 7/70* (2017.01); *H04N 7/183* (2013.01); *B60W 60/0025* (2020.02); *B60W 2300/12* (2013.01); *B60W 2420/403* (2013.01); *B60W 2554/801* (2020.02); *B60W 2554/802* (2020.02); *B60W 2710/18* (2013.01); *B60W 2710/20* (2013.01); *G06T 2207/20092* (2013.01); *G06T 2207/30252* (2013.01)

(58) Field of Classification Search
  CPC ............ B60W 50/14; B60W 60/0025; B60W 2554/802; B60W 2554/801; B60W 2300/12; B60W 2420/42; B60W 2710/18; B60W 2710/20; G06T 7/50; G06T 7/70; G06T 2207/20092; G06T 2207/30252; G05D 1/0038; G05D 1/0212; G05D 1/0251; H04N 7/183
  USPC ......................................................... 701/25
  See application file for complete search history.

(56) References Cited

U.S. PATENT DOCUMENTS

| | | | |
|---|---|---|---|
| 2004/0021291 | A1 | 2/2004 | Haug |
| 2014/0303849 | A1 | 10/2014 | Hafner |
| 2015/0104074 | A1 | 4/2015 | Vondran, Jr. |
| 2016/0280268 | A1 | 9/2016 | Hassani et al. |
| 2016/0288601 | A1* | 10/2016 | Gehrke ............. B60D 1/62 |
| 2016/0304122 | A1 | 10/2016 | Herzog |
| 2016/0364966 | A1 | 12/2016 | Dixon |
| 2017/0308990 | A1* | 10/2017 | Middleton ............ G06T 7/50 |
| 2017/0363728 | A1 | 12/2017 | Prasad |
| 2018/0081370 | A1 | 3/2018 | Miller |
| 2018/0118199 | A1* | 5/2018 | Chaney, Jr. ......... B60W 10/20 |
| 2018/0158337 | A1* | 6/2018 | Koravadi ............ G08G 1/0112 |
| 2018/0181142 | A1 | 6/2018 | Baran |
| 2018/0215382 | A1 | 8/2018 | Gupta |
| 2019/0064835 | A1 | 2/2019 | Hoofard |
| 2019/0077457 | A1* | 3/2019 | Xu ................. B62D 15/028 |
| 2021/0365034 | A1 | 11/2021 | DeLizo |

FOREIGN PATENT DOCUMENTS

| | | |
|---|---|---|
| DE | 102017211395 | 2/2018 |
| DE | 102016011324 | 3/2018 |
| EP | 3081405 | 10/2016 |
| GB | 2554427 | 4/2018 |
| WO | 2016164118 | 10/2016 |

OTHER PUBLICATIONS

PCT International Preliminary Report on Patentability in International Application PCT/US2018/035726, mailed Dec. 10, 2020, 8 pages.
PCT International Search Report and Written Opinion in International Application PCT/US2018/035726, mailed Mar. 28, 2019, 10 pages.
European Communication pursuant to Article 94(3) EPC in Application 18920790.5, mailed Jun. 23, 2023, 4 pages.
European Communication pursuant to Article 94(3) EPC in Application 18920791.3, mailed Jun. 23, 2023, 4 pages.
European Extended Search Report in Application 18920791.3, mailed Dec. 21, 2021, 7 pages.
PCT International Preliminary Report on Patentability in International Application PCT/US2018/035740, mailed Dec. 10, 2020, 7 pages.
PCT International Search Report and Written Opinion in International Application PCT/US2018/035740, mailed Feb. 28, 2019, 8 pages.

* cited by examiner

| TIME (OBJECT) | DISTANCE VALUES (IN METERS) | | | | | | | | | | | |
|---|---|---|---|---|---|---|---|---|---|---|---|---|
| T1 (FRONT SURFACE) | 1.14 | 1.13 | 1.13 | 1.13 | 1.12 | 1.11 | 1.11 | 1.11 | 1.11 | 1.12 | 1.13 | 1.13 | 1.14 |
| T2 (CORNER) | 1.04 | 1.03 | 1.03 | 1.03 | 1.02 | 1.01 | 1.01 | 1.01 | 1.01 | 1.02 | 1.03 | 1.03 | 1.04 |
| T3 (BOTTOM SURFACE) | 1.04 | 1.03 | 1.03 | 1.03 | 1.02 | 1.01 | 1.01 | 1.01 | 1.01 | 1.02 | 1.03 | 1.03 | 1.04 |
| T4 (BOTTOM + KINGPIN) | 1.04 | 1.03 | 1.03 | 1.03 | 1.02 | 1.01 | 0.97 | 0.96 | 0.97 | 1.02 | 1.03 | 1.03 | 1.04 |
| T5 (BOTTOM + KINGPIN) | 1.04 | 1.03 | 1.03 | 1.03 | 1.02 | 1.01 | 0.95 | 0.94 | 0.95 | 1.02 | 1.03 | 1.03 | 1.04 |

SYSTEM AND METHODS FOR AUTONOMOUSLY BACKING A VEHICLE TO A TRAILER

BACKGROUND

Generally, vehicles have poor visibility to the rear, and steering while traveling backwards is non-intuitive. Given these difficulties, backing up is one of the more difficult tasks asked of vehicle drivers. For certain types of vehicles such as cargo vans or box vans, these difficulties can be magnified due to a complete lack of visibility to the rear, coupled with the frequent desire to back the vehicle to a loading dock or other location to a high degree of precision. For Class 8 trucks that couple to trailers using fifth wheel or turntable couplings, these difficulties are particularly acute given the need to back the coupling to a trailer kingpin that can be three inches wide or less, and that may be at varying heights depending on a configuration of the landing gear of the trailer. The limited visibility and varying heights leads to frequent coupling failures which can cause damage to the vehicle and the trailer.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of autonomously backing a vehicle to a trailer is provided. An autonomous backing module of the vehicle determines a trailer to target. The autonomous backing module determines a distance to the trailer, an angle of an axis of the trailer, and an angle of an axis of the vehicle. The autonomous backing module determines a path to the trailer. The autonomous backing module transmits one or more commands to components of the vehicle to autonomously control the vehicle to back along the determined path to the trailer.

In some embodiments, a vehicle configured to autonomously back to a trailer is provided. The vehicle comprises a braking control module for electronically controlling a brake system; a steering control module for electronically controlling a steering system; a torque request module for electronically causing the vehicle to produce a requested amount of torque; and an electronic control module (ECM). The ECM is configured to determine a trailer to target; determine a distance to the trailer, an angle of an axis of the trailer, and an angle of an axis of the vehicle; determine a path to the trailer; and transmit one or more commands to the braking control module, the steering control module, and the torque request module to autonomously control the vehicle to back along the determined path to the trailer.

In some embodiments, a non-transitory computer-readable medium having computer-executable instructions stored thereon is provided. The instructions, in response to execution by an electronic control unit (ECU) of a vehicle, cause the vehicle to perform actions for autonomously backing to a trailer, the actions comprising: determining, by the ECU, a trailer to target; determining, by the ECU, a distance to the trailer, an angle of an axis of the trailer, and an angle of an axis of the vehicle; determining, by the ECU, a path to the trailer; and transmitting, by the ECU, one or more commands to components of the vehicle to autonomously control the vehicle to back along the determined path to the trailer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

What is desired are technologies that help drivers reliably conduct these backing and/or coupling tasks. In some embodiments of the present disclosure, an integrated system is provided that helps drivers back vehicles, including to couple to trailers. The system may control throttle, clutch engagement, braking, steering, and suspension height to back the vehicle to couple to a trailer without further operator intervention. In some embodiments, the system may detect the trailer or other objects using video cameras and depth sensors including but not limited to lidar sensors and stereo cameras. In some embodiments, the arrangement of the sensors allows the system to both back the vehicle to the trailer from a distance even when the vehicle is not aligned with the trailer, and positively tracks a kingpin of the trailer to the fifth wheel of the vehicle. In some embodiments, continuous feedback is provided from the environment sensors to help the vehicle stay on the path and couple successfully to the trailer or arrive at the target of the backing operation. In some embodiments, the model of vehicle turning dynamics may be detected by the system without needing to be programmed with the detailed physical configuration of the vehicle.

Figure 1:
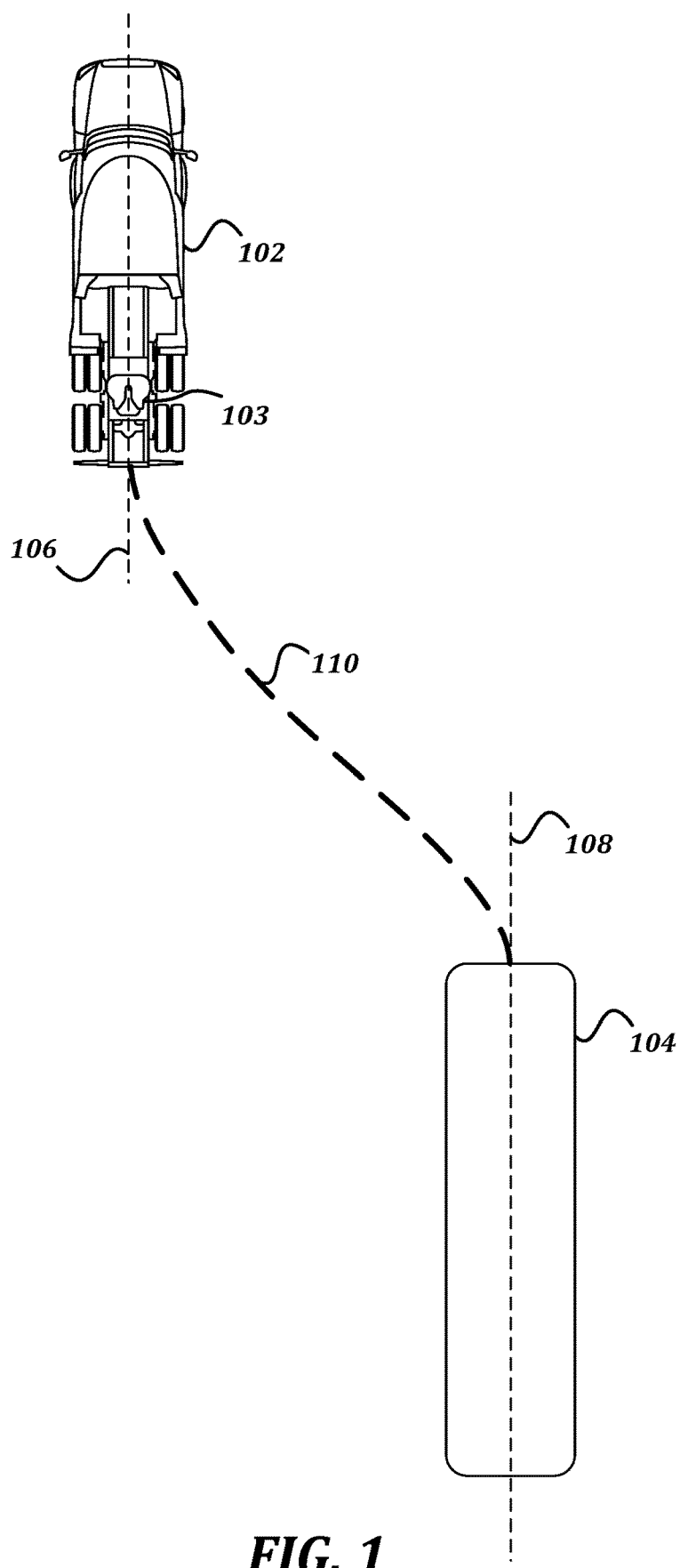
FIG. 1 is a top-down environmental view of an example embodiment of a vehicle traversing a path to couple with a trailer according to various aspects of the present disclosure.

FIG. 1 is a top-down environmental view of an example embodiment of a vehicle traversing a path to couple with a trailer according to various aspects of the present disclosure. FIG. 1 illustrates a vehicle 102 and a trailer 104. The vehicle 102 is located some distance in front of the trailer 104, and is offset laterally from the trailer 104. To couple the vehicle 102 to the trailer 104, the vehicle 102 is backed to the trailer 104 such that the fifth wheel 103 of the vehicle 102 mates with a kingpin (not illustrated) of the trailer 104. Typically, the vehicle 102 is backed in such a manner that it follows a path 110 that causes a longitudinal axis 106 of the vehicle 102 to be aligned with a longitudinal axis 108 of the trailer 104 prior to or upon coupling. Following such a path 110 allows the vehicle 102 and trailer 104 to travel forward in a straight line once coupled without significant off-tracking of the trailer 104, which can be particularly helpful if the trailer 104 is parked between other trailers or other objects. In some embodiments of the present disclosure, the system automatically determines the path 110, and causes the vehicle 102 to autonomously travel along the path 110 and couple to the trailer 104.

Figure 2A:
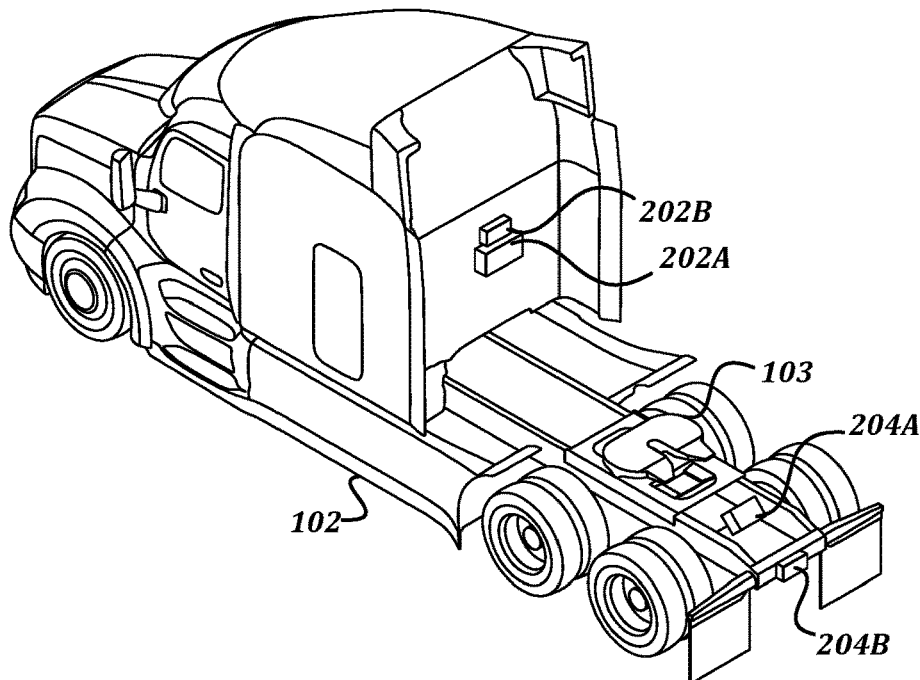
FIGS. 2A, 2B, and 2C are isometric, side, and top views, respectively, of an example embodiment of a vehicle according to various aspects of the present disclosure.
Figure 2B:
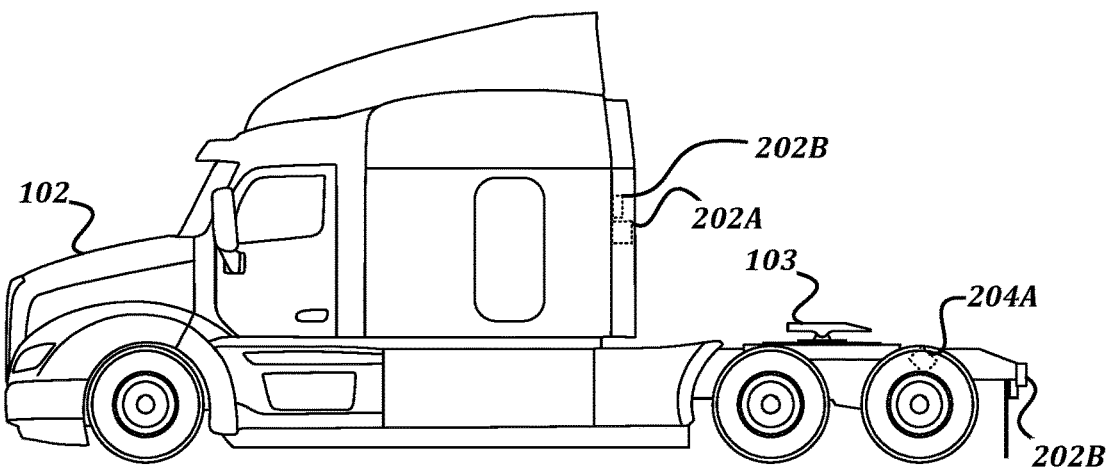
Figure 2C:
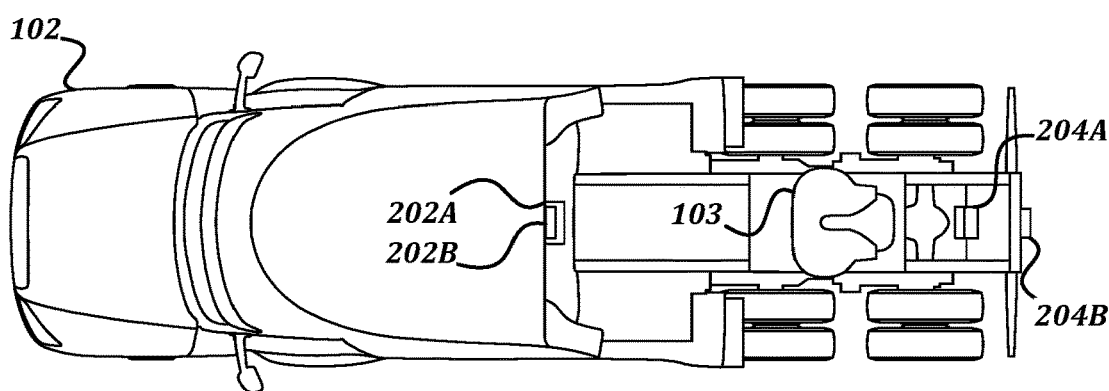

FIGS. 2A, 2B, and 2C are isometric, side, and top views, respectively, of an example embodiment of a vehicle according to various aspects of the present disclosure. In these illustrative views, the vehicle 102 includes a set of upper environment sensors 202 (individually labeled 202A and 202B in this example), and a set of lower environment sensors 204 (individually labeled 204A and 204B). The relative positions of the upper environment sensors 202 and lower environment sensors 204 provides the vehicle 102 with the ability to select a set of sensors that is suited to a desired action, such as backing to an object (e.g., a trailer 104 or a kingpin of a trailer). As shown, each set of environment sensors may provide its own advantages for targeting different types of objects, different portions of objects, or objects in different locations. For example, the upper environment sensors 202 may be used in a process of detecting and backing to a trailer 104, whereas the lower environment sensors 204 may be used in a process of detecting and backing to a kingpin of the trailer. The relative advantages of this configuration and alternative configurations, and illustrative applications of such configurations, are described in further detail below.

Many alternatives to the configuration illustrated in FIGS. 2A, 2B, and 2C are possible. For example, although the illustrated environment sensors 202, 204 are rear-facing to facilitate backing maneuvers described herein, forward-facing or side-facing environment sensors also may be used for other maneuvers, either in lieu of or in combination with rear-facing environment sensors.

As another example, although the illustrated the environment sensors 202, 204 are mounted on rear portions of the vehicle 102, other sensor configurations (e.g., top-mounted or side-mounted sensors) also may be used. These alternative configurations may be useful, for example, to perform autonomous backing maneuvers where the sight lines of the illustrated sensors may be otherwise be blocked by objects, such as an attached trailer in a tractor-trailer combination.

Figure 3:
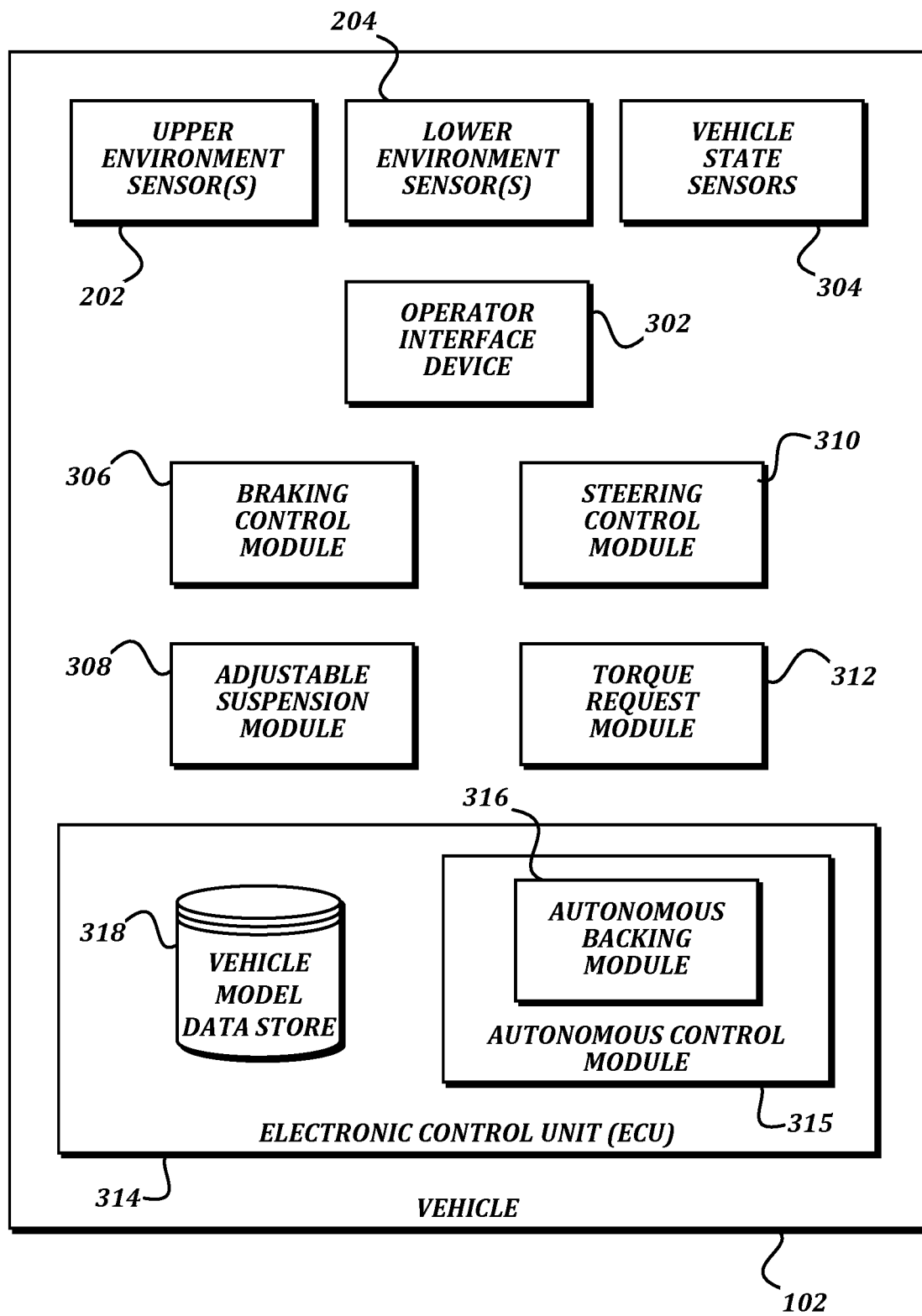
FIG. 3 is a block diagram that illustrates components of an example embodiment of a vehicle according to various aspects of the present disclosure.

FIG. 3 is a block diagram that illustrates components of an example embodiment of a vehicle according to various aspects of the present disclosure. As shown, the vehicle 102 includes an electronic control unit (ECU) 314, a set of upper environment sensors 202, a set of lower environment sensors 204, a set of vehicle state sensors 304, and an operator interface device 302.

In some embodiments, the set of upper environment sensors 202 and the set of lower environment sensors 204 are positioned as illustrated in FIGS. 2A-2C, and may include one or more image sensors and/or one or more range sensors. In some embodiments, the one or more image sensors are devices configured to generate two-dimensional digital image and/or video data, and to provide the digital image and/or video data to other components of the vehicle 102. In some embodiments, the one or more image sensors may include a digital camera. In some embodiments, the one or more range sensors are devices configured to scan an area within a field of view of the sensors, and to provide depth information (e.g., information representing how far away the closest object is in the scanned direction) for the scanned area. In some embodiments, the one or more range sensors may include a lidar sensor, a sonar sensor, and/or a range imaging sensor including but not limited to a stereo camera, a sheet of light triangulation device, a structured light 3D scanner, a time-of-flight camera, an interferometer, and a coded aperture camera. In some embodiments, a single device (such as a stereo camera) may operate as both an image sensor (in that it provides two-dimensional digital image and/or video data) and a range sensor (in that it provides a corresponding depth map). In some embodiments, at least two upper environment sensors are provided in order to provide redundancy. For example, a stereo camera and a lidar sensor may be provided so that depth information generated by the two devices can be cross-referenced against each other in order to minimize the risk of errors being introduced by a single sensor generating faulty data. In some embodiment, similar sensors may be included in the set of upper environment sensors 202 and the set of lower environment sensors 204. In some embodiments, different sensors may be included in the set of upper environment sensors 202 and the set of lower environment sensors 204. In some embodiments, environment sensors in addition to the illustrated environment sensors 202, 204 may be provided, including but not limited to environment sensors that monitor an area in front of the vehicle 102 and environment sensors that monitor areas to the sides of the vehicle 102.

In some embodiments, the set of vehicle state sensors 304 includes one or more devices configured to provide information regarding the vehicle 102 itself. Some non-limiting examples of vehicle state sensors 304 include an engine speed sensor, a brake pedal sensor, an accelerator pedal sensor, a steering angle sensor, a parking brake sensor, a transmission gear ratio sensor, a battery level sensor, an ignition sensor, and a wheel speed sensor. The information generated by the vehicle state sensors 304 may be used in the various methods and procedures as described further below.

In some embodiments, the operator interface device 302 may be configured to provide an operator such as a driver of the vehicle 102 with a user interface. In some embodiments, the operator interface device 302 may include a display (such as a video monitor) for presenting information to the operator, and may also include one or more user input devices (such as buttons, dials, or sliders) for receiving input from the operator. In some embodiments, a single component of the operator interface device 302, such as a touchscreen, may both present information to the operator and receive input from the operator.

In some embodiments, the ECU 314 is a computing device that is configured to receive information from sensors 202, 204, 304, process the information, and send commands or other information to other components of the vehicle 102. In some embodiments, the ECU 314 may include one or more memory devices including but not limited to a random access memory ("RAM") and an electronically erasable programmable read-only memory ("EEPROM"), and one or more processors.

As shown, the ECU 314 includes a vehicle model data store 318, an autonomous control module 315, and an autonomous backing module 316. In some embodiments, the autonomous control module 315 is configured to receive information from sensors 202, 204, 304 and to automatically control functionality of the vehicle 102, including but not limited to controlling a height of a suspension of the vehicle 102, controlling steering of the vehicle 102, controlling forward or backward motion of the vehicle 102, and controlling a transmission of the vehicle 102. In some embodiments, the autonomous backing module 316 is provided as a sub-component of the autonomous control module 315, and is responsible for managing autonomous backing operations. In some embodiments, the autonomous backing module 316 and the autonomous control module 315 may not be provided as a module and sub-module, and may instead be provided as a single module configured to provide the functionality as described below of both modules, or as separate modules. Accordingly, some embodiments may provide an autonomous control module 315 without an autonomous backing module 316, some embodiments may provide an autonomous backing module 316 without an autonomous control module 315, and some embodiments may provide both. In some embodiments, the vehicle model data store 318 is configured to store a model that describes turning dynamics of the vehicle 102 that may be used by the autonomous control module 315 or the autonomous backing module 316 to determine paths and control the vehicle 102 during autonomous operations.

As shown, the vehicle 102 also includes a braking control module 306, a steering control module 310, an adjustable suspension module 308, and a torque request module 312. In some embodiments, the braking control module 306 is configured to transmit commands to a braking system to actuate brakes of the vehicle 102. The braking control module 306 may be (or may include, or may be a part of) an anti-lock braking system (ABS) module. In some embodiments, the steering control module 310 is configured to transmit commands to a steering system to turn wheels of the vehicle 102. In some embodiments, the adjustable suspension module 308 is configured to transmit commands to an adjustable suspension system, such as an air ride suspension system, to raise or lower the suspension of the vehicle 102. In some embodiments, the torque request module 312 receives torque requests (e.g., requests from other components of the vehicle 102 for the vehicle to produce a requested amount of torque in order to, for example, cause the vehicle 102 to move). In some embodiments, the torque request module 312 may translate the torque request to a fuel rate and/or other value to be provided to an engine control unit in order to generate the requested amount of torque. In some embodiments, the torque request module 312 may translate the torque request to a voltage or other value to provide to an electric motor in order to generate the requested amount of torque. In some embodiments, the torque request module 312 may determine how to satisfy the torque request using more than one power source, such as a combination of an internal combustion engine and one or more electric motors. In some embodiments, the vehicle 102 may also include a transmission control module, a clutch control module, or other modules that can be used to control operation of the vehicle 102. These components have not been illustrated or described herein for the sake of brevity.

In general, the term "module" as used herein refers to logic embodied in hardware such as an ECU, an application-specific integrated circuit (ASIC) or a field-programmable gate array (FPGA); or embodied in software instructions executable by a processor of an ECU, an ASIC, an FPGA, or a computing device as described below. The logic can be written in a programming language, such as C, C++, COBOL, JAVA™, PHP, Perl, HTML, CSS, JavaScript, VBScript, ASPX, HDL, Microsoft .NET™ languages such as C #, and/or the like. A module may be compiled into executable programs or written in interpreted programming languages. Modules may be callable from other modules or from themselves. Generally, the modules described herein refer to logical components that can be merged with other modules, or can be divided into sub-modules. The modules can be stored in any type of computer readable medium or computer storage device and be stored on and executed by one or more general purpose computers, thus creating a special purpose computer configured to provide the module. Accordingly, the devices and systems illustrated herein may include one or more computing devices configured to provide the illustrated modules, though the computing devices themselves have not been illustrated in every case for the sake of clarity.

As understood by one of ordinary skill in the art, a "data store" as described herein may be any suitable device configured to store data for access by an ECU or other computing device. One non-limiting example of a data store is a highly reliable, high-speed relational database management system (DBMS) executing on one or more computing devices and accessible over a high-speed network. Another non-limiting example of a data store is a key-value store. Another non-limiting example of a data store is a lookup table. Another non-limiting example of a data store is a file system. However, any other suitable storage technique and/or device capable of quickly and reliably providing the stored data in response to queries may be used. A data store may also include data stored in an organized manner on a computer-readable storage medium including but not limited to a flash memory, a ROM, and a magnetic storage device. One of ordinary skill in the art will recognize that separate data stores described herein may be combined into a single data store, and/or a single data store described herein may be separated into multiple data stores, without departing from the scope of the present disclosure.

As stated above, the various components illustrated in FIG. 3 may communicate with each other through a vehicle-wide communications network. Those skilled in the art and others will recognize that the vehicle-wide communications network may be implemented using any number of different communication protocols such as, but not limited to, Society of Automotive Engineers' ("SAE") J1587, SAE J1922, SAE J1939, SAE J1708, and combinations thereof. In some embodiments, other wired or wireless communication technologies, such as WiFi, Ethernet, Bluetooth, or other technologies may be used to connect at least some of the components to the vehicle-wide communication network.

Figure 4A:
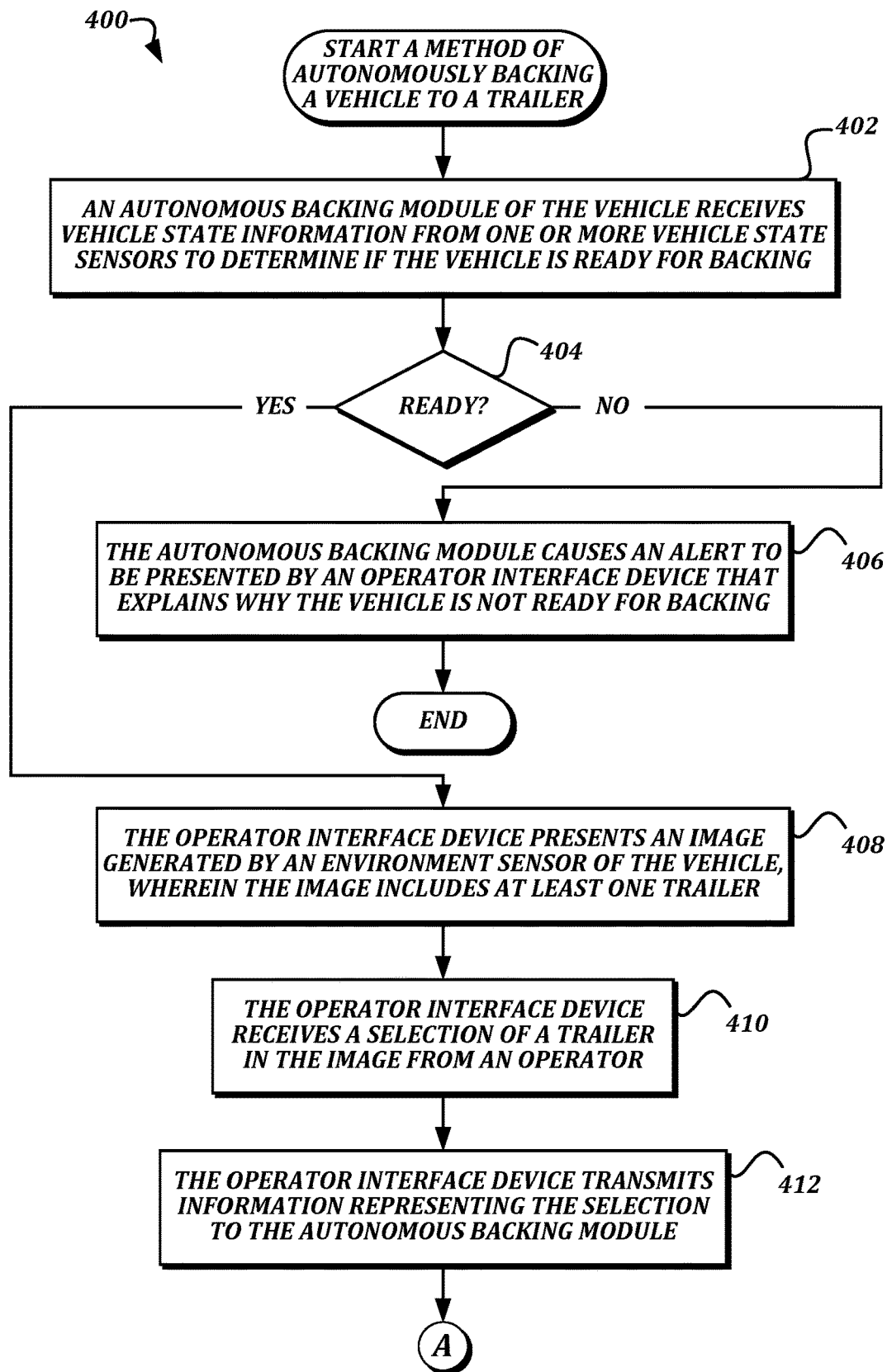
FIGS. 4A-4C are a flowchart that illustrates an example embodiment of a method of autonomously backing a vehicle to a trailer according to various aspects of the present disclosure.
Figure 4B:
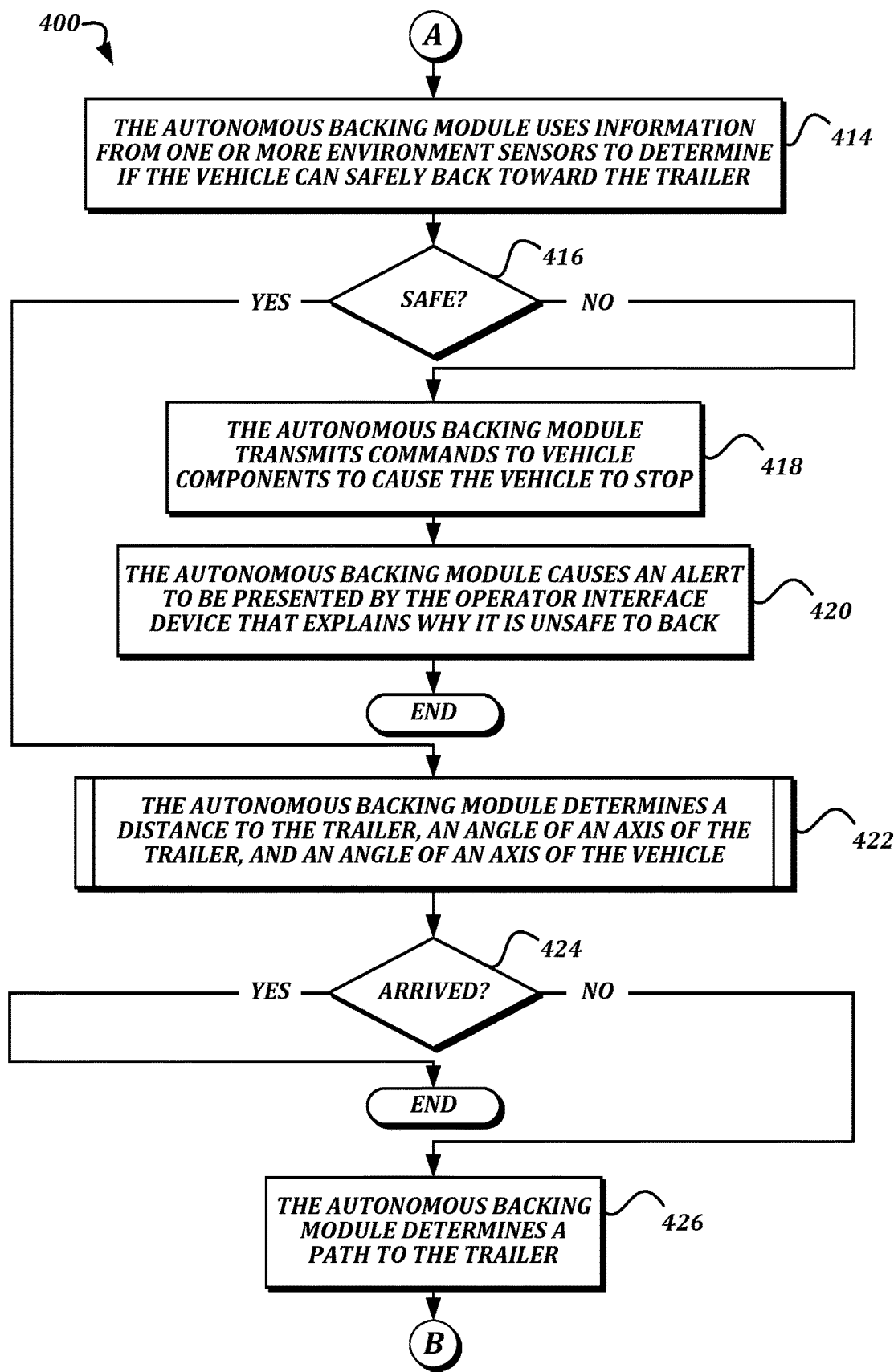
Figure 4C:
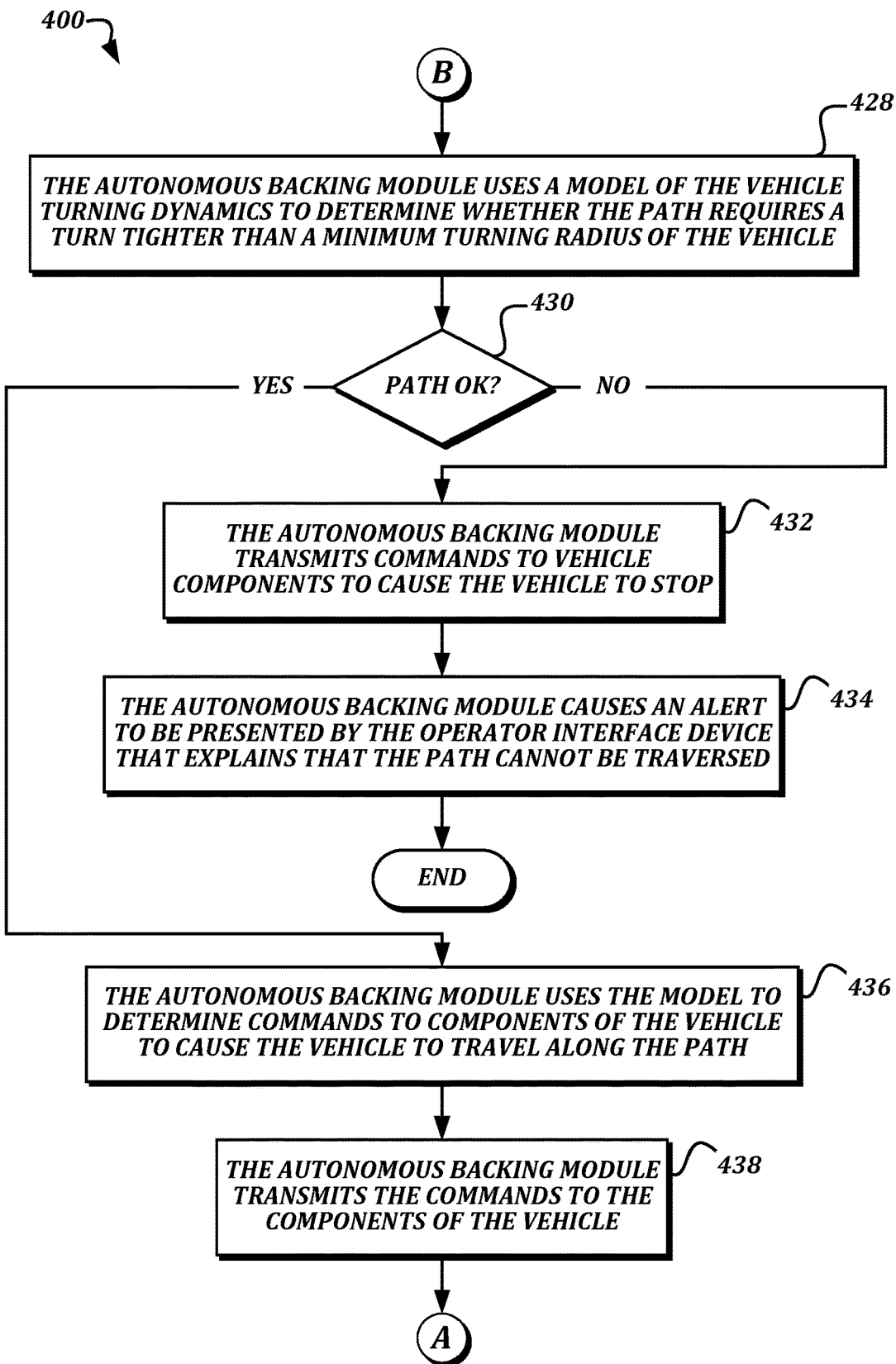

FIGS. 4A-4C are a flowchart that illustrates an example embodiment of a method of autonomously backing a vehicle to a trailer according to various aspects of the present disclosure. From a start block, the method 400 proceeds to block 402, where an autonomous backing module 316 of the vehicle 102 receives vehicle state information from one or more vehicle state sensors 304 to determine if the vehicle 102 is ready for backing. As some non-limiting examples, the vehicle state information may indicate a state of an ignition key, a state of a parking brake, an indication of whether the vehicle 102 is stationary or moving, and/or an indication of whether a transmission of the vehicle 102 is in an appropriate reverse gear.

Next, at decision block 404, a determination is made based on the vehicle state information regarding whether the vehicle 102 is ready for backing. If the vehicle state information indicates that the vehicle 102 is not ready for backing, then the result of decision block 404 is NO, and the method 400 proceeds to block 406, where the autonomous backing module 316 causes an alert to be presented by an operator interface device 302 that explains why the vehicle is not ready for backing. In some embodiments, the presented alert may indicate a vehicle state that prevented backing, including but not limited to an improper transmission gear selection, an improper state of an ignition key, and an improper state of a parking brake. The method 400 then proceeds to an end block and terminates.

Figure 7:
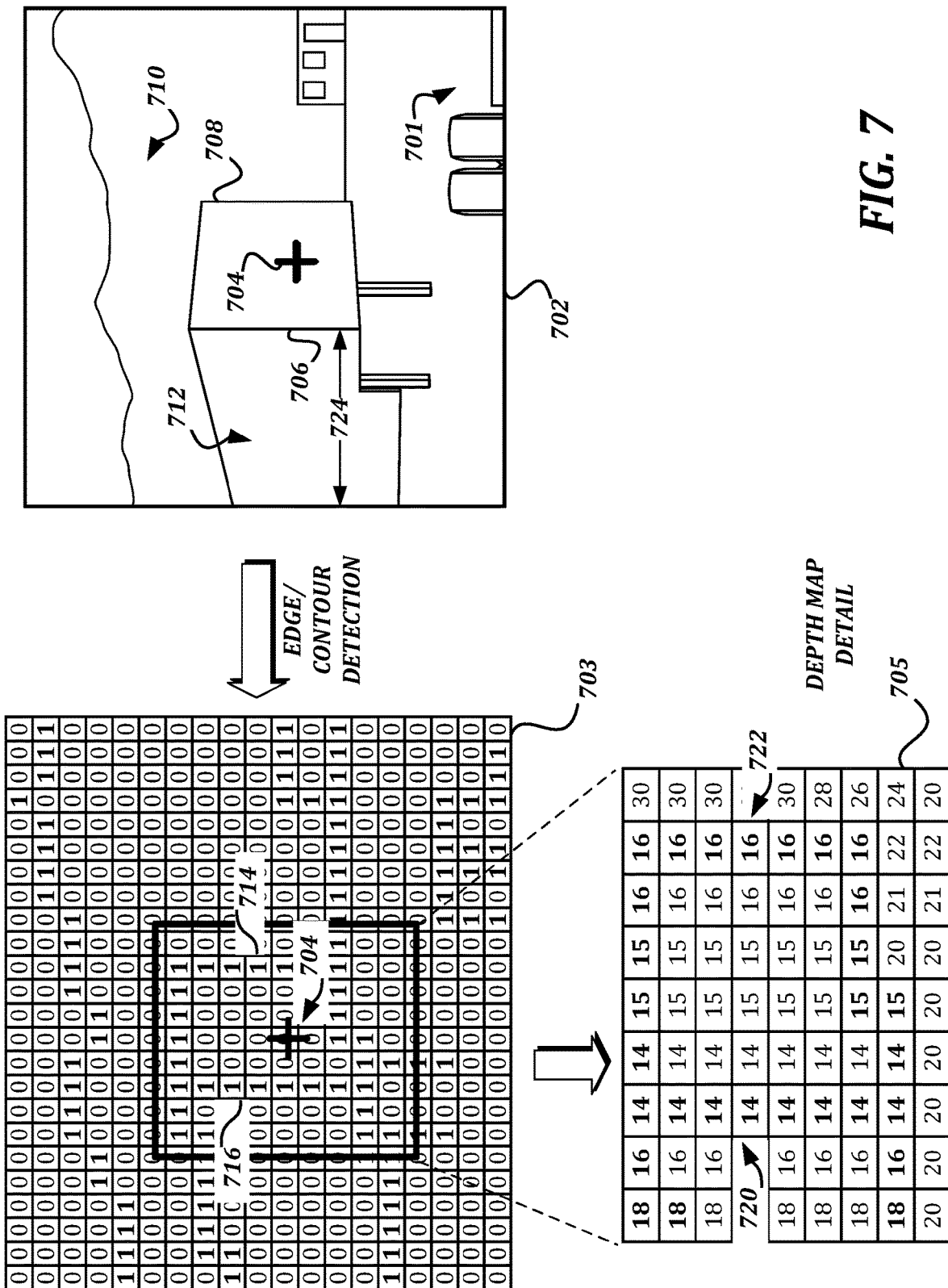
FIG. 7 shows an example embodiment of an image, an edge map, and a depth map according to various aspects of the present disclosure.

Returning to decision block 404, if the vehicle state information indicates that the vehicle 102 is ready for backing, then the result of decision block 404 is YES, and the method 400 proceeds to block 408. At block 408, the operator interface device 302 presents an image generated by an environment sensor 202, 204 of the vehicle 102, wherein the image includes at least one trailer. Typically, the image is generated by an image sensor of the upper environment sensors 202, because such a sensor may have the most useful field of view for long-distance navigation and selection of a trailer. In some embodiments, however, an image sensor included with the lower environment sensors 204 may be used instead. The decision to use an image sensor of the upper environment sensors 202 or the lower environment sensors 204 may be configurable by the operator. It is assumed for the purposes of this example that there is at least one trailer in the field of view of the environment sensors 202, 204 before the method 400 begins. Otherwise, the method 400 may end at this point if no trailer is visible in the image. In some embodiments, the image could depict more than one trailer, such that the operator may choose between multiple trailers. In some embodiments, the image depicts at least an entirety of a front surface of the trailer (e.g., both a left front edge and a right front edge can be seen in the image). FIG. 7 illustrates an example embodiment of such an image 702, and is discussed further below.

At block 410, the operator interface device 302 receives a selection of a trailer in the image from an operator. In some embodiments, the operator may position a crosshair shown by the operator interface device 302 on the front surface of the trailer to be selected. The operator may do this by moving the displayed crosshairs with buttons of the operator interface device 302, by tapping a touch screen, or using any other suitable technique. The crosshair 704 is also illustrated in FIG. 7 and discussed further below. In some embodiments, the operator may be a driver of the vehicle 102 or may otherwise be located within a cab of the vehicle 102 (such as a passenger or co-driver). In some embodiments, the operator and/or the operator interface device 302 may be located remotely from the vehicle 102, and the operator may be presented with the image from the environment sensor 202, 204 via a communication network. Alternatively, computer-implemented image recognition systems may be used to automatically identify and select objects, such as trailers, based on information obtained by the environment sensors. In this situation, selection of the trailer may proceed without operator intervention, or an image recognition system may make a preliminary selection of a trailer (e.g., by initially placing the crosshairs in an appropriate location) and request the operator to confirm the selection or make a different selection via the operator interface.

Next, at block 412, the operator interface device 302 transmits information representing the selection to the autonomous backing module 316. In some embodiments, the information representing the selection may be a pixel location (e.g., an X-location and a Y-location) within the image. The method 400 then proceeds to a continuation terminal ("terminal A").

From terminal A (FIG. 4B), the method 400 proceeds to block 414, where the autonomous backing module 316 uses information from one or more environment sensors 202, 204 to determine if the vehicle 102 can safely back toward the trailer. In some embodiments, the information may indicate whether any obstructions lie between the vehicle 102 and the trailer. In some embodiments, an area checked for obstructions may be an area directly between the vehicle 102 and the trailer. In some embodiments, an area checked for obstructions may be an area directly behind the vehicle 102. In some embodiments, environment sensors mounted to have views to the sides of the vehicle 102 may check for lateral obstructions that may prevent the front end of the vehicle 102 from swinging out to turn to a path to the trailer. In some embodiments, information from two or more environment sensors 202, 204 may be compared to each other to ensure the reliability of the information. If the information gathered by separate sensors does not agree, it may indicate that it is unsafe to proceed. In some embodiments, information from the environment sensors 202, 204 may be analyzed to determine whether the information is likely to be incorrect. For example, if a range sensor indicates zero distance to an obstacle, it may be an indication that information from the sensor is unreliable and should be discarded.

At decision block 416, a determination is made regarding whether the information from the environment sensors 202, 204 indicates that the vehicle 102 can safely back toward the trailer. If not (e.g., if an obstruction was detected or the data from the environment sensors 202, 204 could not be cross-validated), then the result of decision block 416 is NO, and the method 400 proceeds to block 418, where the autonomous backing module 316 transmits commands to vehicle components to cause the vehicle 102 to stop. In some embodiments, these commands may include transmitting a command to the braking control module 306 to engage the brakes, and/or a command to the torque request module 312 to reduce an amount of torque generated by the engine. At block 420, the autonomous backing module 316 causes an alert to be presented by the operator interface device 302 that explains why it is unsafe to back. For example, the alert may state that an obstruction was detected, or may state that the environment sensors 202, 204 are not generating reliable data. The method 400 then proceeds to an end block and terminates. The operator may, at this point, resolve the safety issue and restart the method 400.

Returning to decision block 416, if the information from the environment sensors 202, 204 indicates that the vehicle 102 can safely back toward the trailer, then the result of decision block 416 is YES, and the method 400 proceeds to procedure block 422. At procedure block 422, the autonomous backing module 316 determines a distance to the trailer, an angle of a longitudinal axis of the trailer, and an angle of a longitudinal axis of the vehicle 102. Any suitable procedure may be used in procedure block 422, including but not limited to the procedure illustrated in FIG. 6 and described in detail below. In some embodiments, the procedure called at procedure block 422 is provided information from the environment sensors 202, 204 such as an image and a depth map, as well as the location of the crosshair or other indicator of the location selected in the image by the operator. In some embodiments, the procedure returns the distance to the trailer and the angle of the axes. In some embodiments, the distance and angles may be specified with relation to a coordinate system that coincides with the ground and has an origin located at a center of the front face of the trailer, an X-axis extending perpendicular from the front face of the trailer along the longitudinal axis of the trailer, a Y-axis extending along the front face of the trailer, and a Z-axis extending perpendicular to the ground.

Figure 9A:
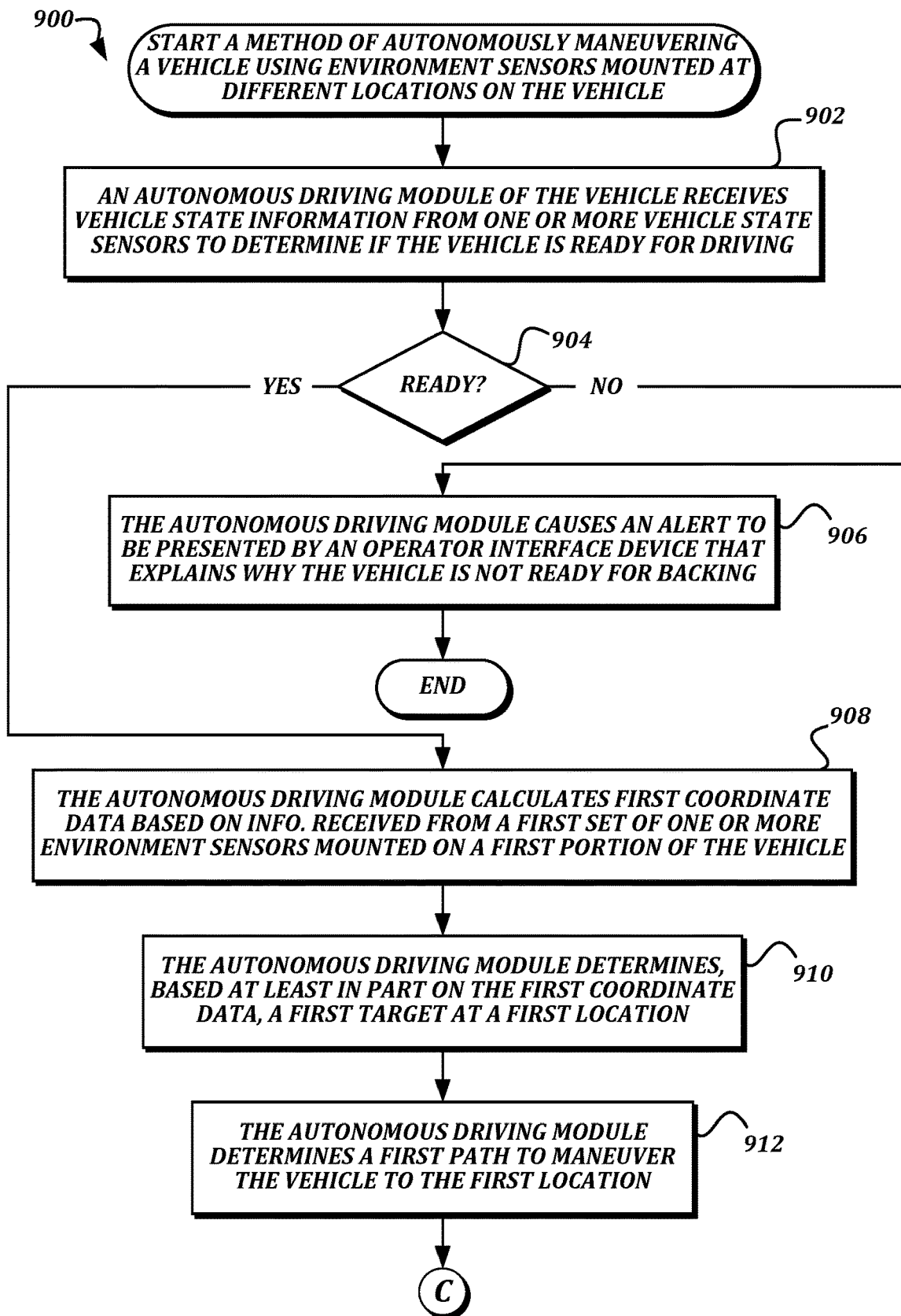
FIGS. 9A-9C are a flowchart that illustrates an example embodiment of a method of autonomously maneuvering a vehicle using environment sensors mounted at different locations on the vehicle according to various aspects of the present disclosure.
Figure 9B:
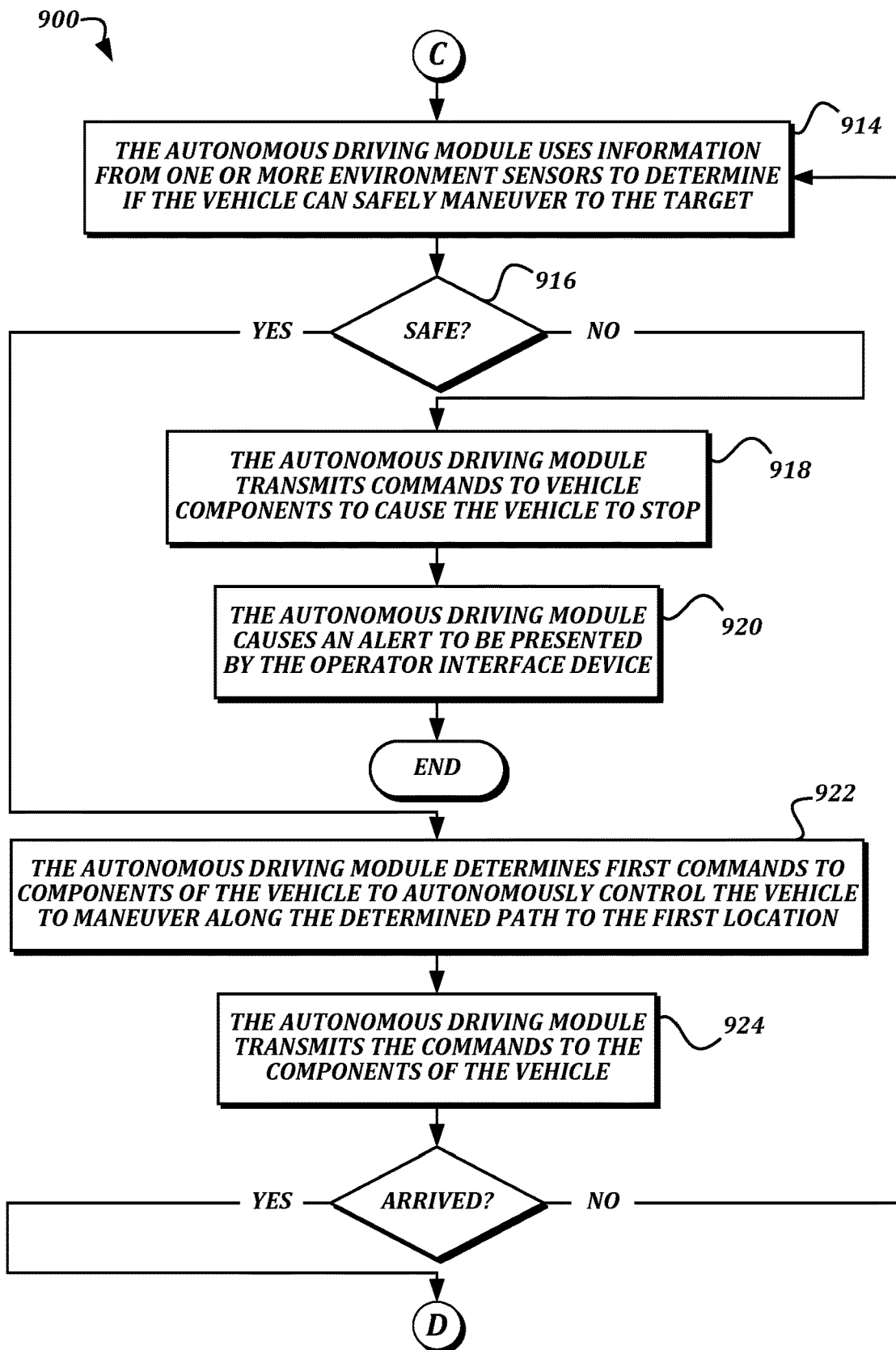
Figure 9C:
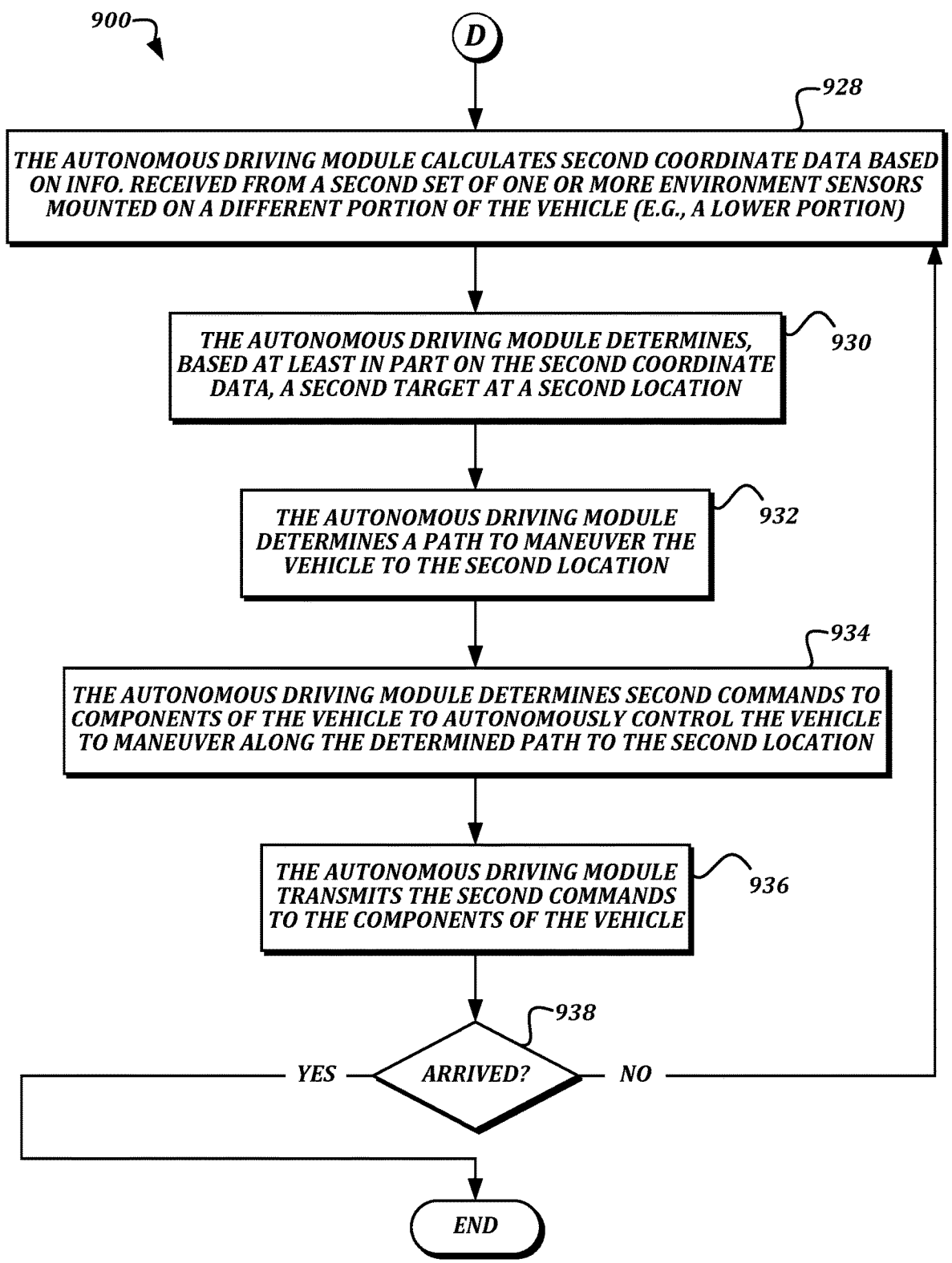

At decision block 424, a determination is made regarding whether the vehicle 102 has arrived at the trailer. In some embodiments, an environment sensor 202, 204 such as a range sensor could detect that a rear of the vehicle 102 has arrived within a predetermined distance of the front surface of the trailer to determine that the vehicle 102 has arrived. This predetermined distance may be configurable by the operator. In some embodiments, the vehicle 102 may be considered to have "arrived" once it is appropriate to hand over control of the autonomous operation to other sensors or control systems, such as illustrated in FIGS. 9A-C and discussed further below. If it is determined that the vehicle 102 has arrived at the trailer, then the result of decision block 424 is YES, and the method 400 proceeds to an end block and terminates. Otherwise, the result of decision block 424 is NO, and the method 400 proceeds to block 426.

Figure 5:
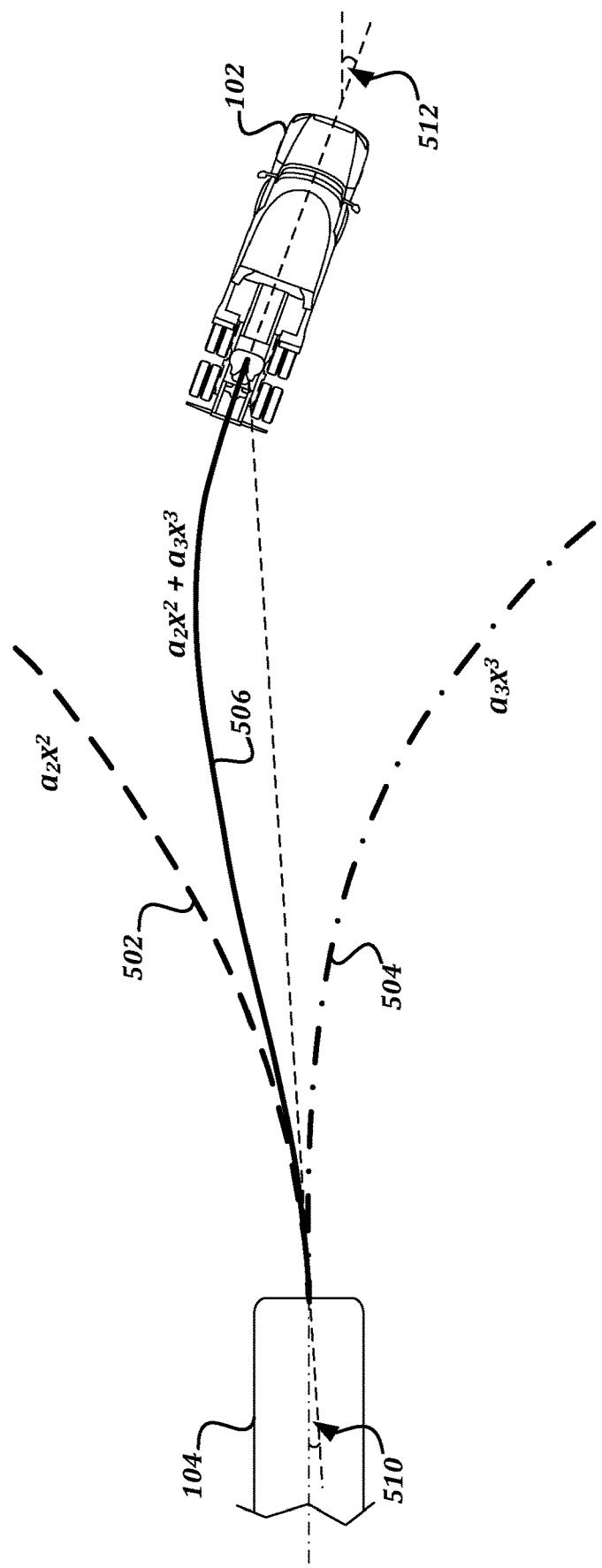
FIG. 5 is a top-down schematic diagram that illustrates an example embodiment of a determination of a path from a vehicle location to a trailer according to various aspects of the present disclosure.

At block 426, the autonomous backing module 316 determines a path to the trailer. As noted above with respect to the return values of the procedure executed at procedure block 422, the path calculation may assume a coordinate system such as a Cartesian coordinate system with an X-axis parallel to the trailer length and an origin at, or slightly in front of, a center of the trailer face. In some embodiments, the path may be described by a multi-order polynomial function. The position of the vehicle 102 along the path may be given in terms of parameters that include a distance, an angle of a longitudinal axis of the vehicle 102, and an angle from a component of the vehicle 102 (such as the fifth wheel or an environment sensor 202, 204) to the origin of the coordinate system. Using these terms and the wheelbase of the vehicle 102 (e.g., a distance between a front axle and a back axle of the vehicle 102), the method 400 may determine the coordinates of the front axle and the back axle within the coordinate system. In some embodiments, the wheel base of the vehicle 102 may be determined from the model stored in the vehicle model data store 318. Using the coordinates of the back axle and/or the front axle as constants within the coordinate system, the path from the vehicle 102 to the trailer is calculated. In some embodiments, other coordinates may be used instead of the coordinates of the back axle and/or the front axle, including but not limited to coordinates of individual wheels of the vehicle 102. FIG. 5 is a top-down schematic diagram that illustrates an example embodiment of a determination of a path from a vehicle location to a trailer according to various aspects of the present disclosure. As shown, the path 506 from the vehicle 102 to the trailer 104 is a combination of a second order term 502 and a third order term 504 of a third-order polynomial function.

Returning to FIG. 4B, the method 400 then proceeds to a continuation terminal ("terminal B"), and from terminal B (FIG. 4C), the method 400 proceeds to block 428, where the autonomous backing module 316 uses a model of the vehicle turning dynamics to determine whether the path requires a turn tighter than a minimum turning radius of the vehicle 102. In some embodiments, the model may be retrieved from the vehicle model data store 318. The model may specify various parameters that describe vehicle turning dynamics, including but not limited to a wheelbase length, an axle track width, a scrub radius, and a maximum steer angle. These factors may be used to determine a minimum turn radius of the vehicle 102. A Taylor series expansion of the curvature of the path determined at block 426 may be taken and compared to matching power terms to determine if the path will require a sharper turn than the minimum turning radius.

For example, in some embodiments, at least one of the following equations may be used:

$$\frac{f''(x)}{(1 + [f'(x)^2])^{3/2}} \leq \frac{1}{r_{min}}$$

$$r_{min}^2(4(a_2^2) + 24a_2a_3x + 36a_3^2x^2) = 1 + 12a_2^2x^2\ldots$$

At decision block 430, a determination is made regarding whether the path is acceptable. In some embodiments, this determination may be based on whether the turns are all larger than the minimum turning radius. In some embodiments, the determination may also include an environment check that includes checking areas through which the front of the vehicle 102 will travel out in order to turn along the path for obstructions. If the path is determined to not be acceptable (e.g., the path requires a turn that is smaller than the minimum turning radius), then the result of decision block 430 is NO, and the method 400 proceeds to block 432, where the autonomous backing module 316 transmits commands to vehicle components to cause the vehicle 102 to stop. These commands are similar to the commands transmitted at block 418 and described above. At block 434, the autonomous backing module 316 causes an alert to be presented by the operator interface device 302 that explains that the path cannot be traversed. In some embodiments, the alert may include the reason why the path cannot be traversed, such as the path requiring turns that are too tight or an obstruction being present. In some embodiments, the alert may include guidance for resolving the issue, including but not limited to moving the vehicle 102 farther from the trailer or moving the vehicle 102 to be more closely aligned to the longitudinal axis of the trailer. The method 400 then proceeds to an end block and terminates.

Returning to decision block 430, if it is determined that the path is acceptable, then the result of decision block 430 is YES, and the method 400 proceeds to block 436. At block 436, the autonomous backing module 316 uses the model to determine commands to components of the vehicle 102 to cause the vehicle 102 to travel along the path, and at block 438, the autonomous backing module 316 transmits the commands to the components of the vehicle 102. For example, the autonomous backing module 316 may determine an amount the vehicle 102 should be turning at the current point in the path, determine a steering angle to cause the vehicle 102 to turn at that determined rate, and transmit a command to the steering control module 310 to implement the steering angle. As another example, the autonomous backing module 316 may transmit a command to the torque request module 312 to increase speed to move the vehicle 102 once the steering angle is set. As another example, the autonomous backing module 316 may transmit a command to a clutch (not pictured) to engage the transmission in order to cause the vehicle 102 to begin moving. As yet another example, the autonomous backing module 316 may transmit a command to the braking control module 306 to release or otherwise control the brakes.

In some embodiments, in order to facilitate control, the autonomous backing module 316 implements a multi-threaded C++ application that handles sending and receiving messages on a vehicle communication network such as the J1939 CAN bus. These threads communicate between the autonomous backing module 316 and the various other components. These threads may run separately from a main program of the autonomous backing module 316 and may utilize atomic variables to communicate back and forth.

In some embodiments, a first thread may handle communication with the steering control module 310. Once initialized, the thread may maintain constant communication with the steering control module 310. The thread sends steering commands at specified intervals, updating the message when a new steering angle is specified by the main program. The other threads used to control braking and vehicle 102 speed may work in a similar manner. Single messages are able to read off the data bus at any time without requiring their own independent thread. Accordingly, in some embodiments, commands received from the operator, such as pressing a brake pedal, may supersede the commands generated by the autonomous backing module 316. In such situations, the method 400 may continue to operate, but may pause while the countervailing command is being issued. For example, the autonomous backing procedure may pause while a brake pedal is being pressed, and may resume once the brake pedal is released.

The method 400 then proceeds to a continuation terminal ("terminal A"), where it loops back to an earlier portion of the method 400 in order to implement a control loop. Within the control loop and as described above, the method 400 repeats the steps of checking the location, doing safety checks, computing a path from the current location, determining that the path is clear and can be traversed, and determining/transmitting commands to keep the vehicle on the path. Eventually, the control loop exits when the vehicle 102 is determined to have arrived at the trailer at decision block 424 or when an error state occurs.

In some embodiments, the control loop would include keeping the crosshairs on the trailer. That is, at block 410, the operator provided a selection of a location on the front surface of the trailer within the image presented on the operator interface device 302. As the vehicle 102 travels on the path and begins to turn, the trailer will move within the image. Accordingly, before procedure block 422, the method 400 may ensure that the crosshairs or other indication of the selected trailer surface remains located on the trailer surface, or at least between the edges detected by the procedure called at procedure block 422. In some embodiments, the procedure called by procedure block 422 may automatically center the selected location between the detected edges each time it is called in order to ensure that the selected location remains on the surface.

The method 400 illustrated and discussed above relates to backing a vehicle 102 to a trailer However, similar techniques may be used to back a vehicle 102 to any other target object that can be detected by the environment sensors 202, 204. To be detected by the environment sensors 202, 204, the target object should include a surface that has a left edge and a right edge that flank a selectable location on a surface and can be detected via edge detection or depth discontinuities as discussed further below. For example, similar techniques may be used to back a vehicle to a target object that is a loading dock, a loading bay, a dock leveler, a garage door, a wall area between two bumpers of a color that contrasts with the wall, a wall area between two painted lines, or another vehicle. Because depth discontinuities may be used to detect the edges, a lack of a surface or a distant surface may be selectable as well, such as selecting the end of an alley (where the alley walls form the detectable edges) and using the method 400 to back the vehicle 102 either out of or into the alley.

Figure 6:
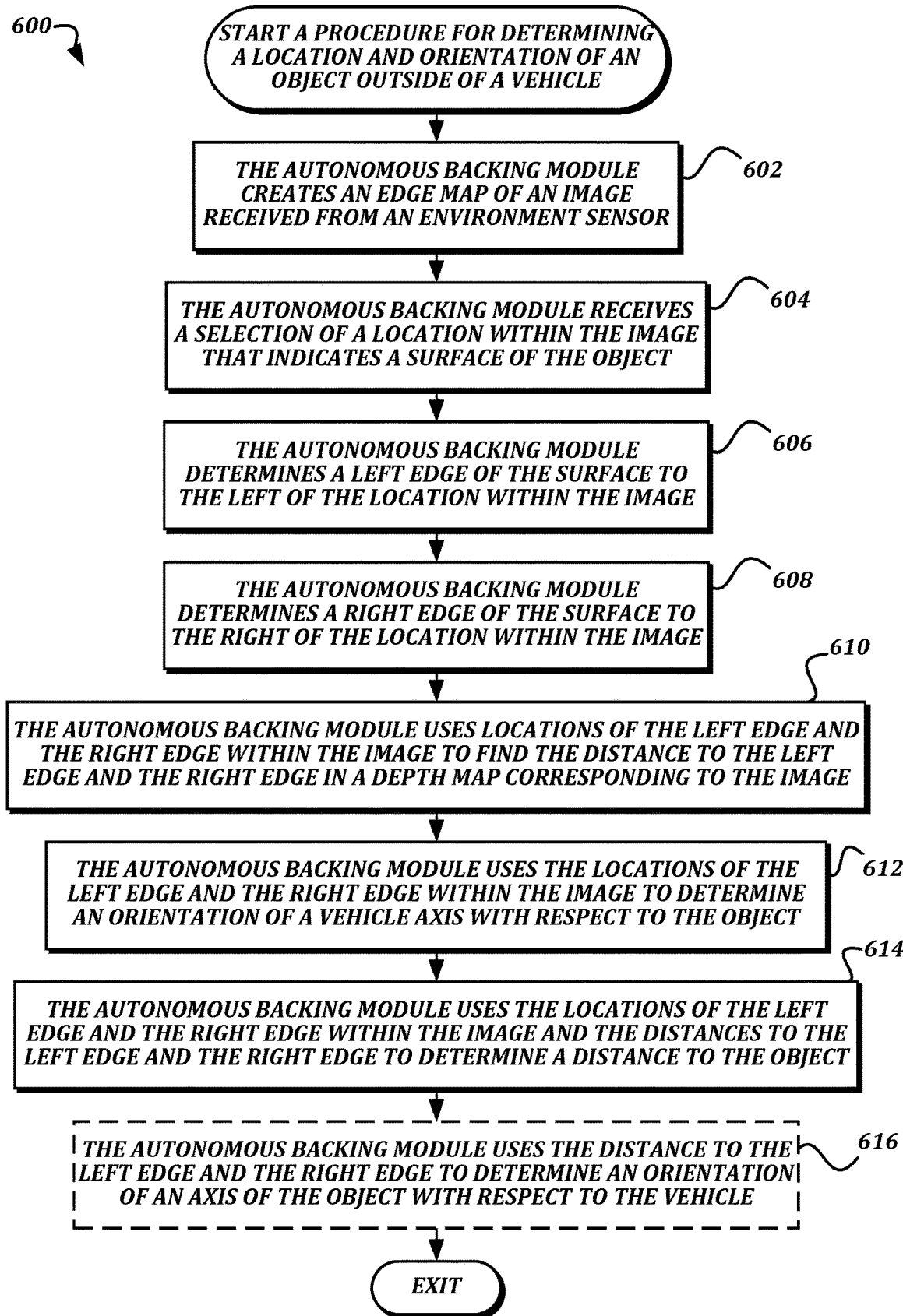
FIG. 6 is a flowchart that illustrates an example embodiment of a procedure for determining a location and orientation of an object outside of a vehicle according to various aspects of the present disclosure.

FIG. 6 is a flowchart that illustrates an example embodiment of a procedure for determining a location and orientation of an object outside of a vehicle according to various aspects of the present disclosure. The procedure 600 is an example of a procedure that may be used at procedure block 422 of FIG. 4B as discussed above. The procedure 600 is also an example of a procedure that may be used at procedure blocks 1302 and 1308 of FIG. 13. Some of these procedure blocks 422, 1302, 1308 may refer to determining a location and orientation of a particular object, such as a trailer, but the procedure 600 could be used to detect any object for which environment sensors can find a surface by detecting edges or depth discontinuities.

From a start block, the procedure 600 advances to block 602, where the autonomous backing module 316 creates an edge map of an image received from an environment sensor 202, 204. Typically, the image is received from a camera, and pixels of the image encode a visual representation of the field of view of the camera. The edge map is a matrix of values that indicate a presence or an absence of an edge (or a brightness discontinuity or other discontinuity) in a corresponding pixel of the image. The edge map may be created by processing the image using an edge detection algorithm. Examples of edge detection algorithms include but are not limited to Canny edge detection, Deriche edge detection, differential edge detection, Sobel filters, Prewitt operators, and Roberts cross operators. At block 604, the autonomous backing module 316 receives a selection of a location within the image that indicates a surface of the object. The surface may be any portion of the object having a left edge and a right edge when measured from the selected location, or depth discontinuities to the left and right of the selected location. In some embodiments, the selection of the location within the image may be provided by the user to the operator interface device 302 and provided to the procedure 600 upon the initial call to the procedure 600.

FIG. 7 shows an example of an image 702 processed at block 602. The image 702 shows a scene that includes a trailer viewed from an upper environment sensor 202 of a vehicle 102. Visible in the bottom of the image 702 is a portion of the rear 701 of the vehicle 102. As illustrated, the rear portion 701 of the vehicle 102 is shown in the lower right portion of the image 702. In some embodiments, the upper environment sensor 202 may be centered in the rear of the vehicle 102, and so the rear portion 701 would appear in the middle of the image 702. Given the limited space available in the drawing, the image 702 illustrated depicts an image that been cropped to a relevant portion in order to be able to illustrate greater detail. As shown, crosshairs 704 indicate a location indicated by the operator as being on the surface of the trailer The image shows a left front edge 706 and a right front edge 708 of the trailer, as well as a left side 712 of the trailer. The trailer is depicted against a background 710 that is some distance behind the trailer.

FIG. 7 also shows an example of an edge map 703 created from the image 702. The edge map 703 is a grid of values that corresponds to pixels of the image 702. The values are "0" if an edge was not detected in the corresponding pixel, and "1" if an edge was detected in the corresponding pixel. The crosshairs 718 indicate the corresponding point in the edge map 703 as the crosshairs 704 in the image 702, for reference.

Returning to FIG. 6, at block 606, the autonomous backing module 316 determines a left edge of the surface to the left of the location within the image, and at block 608, the autonomous backing module 316 determines a right edge of the surface to the right of the location within the image. In some embodiments, the left edge may be found by starting at the selected location in the edge map, and moving to the left in the edge map until an edge is found. Similarly, the right edge may be found by starting at the selected location in the edge map, and moving to the right in the edge map until an edge is found. In some embodiments, if multiple contiguous pixels are found that include edges, the edge may be identified in the last pixel found that includes an edge. As shown in the edge map 703 of FIG. 7, starting at the crosshairs 704, the left edge 716 is found two pixels to the left of the crosshairs 704, and the right edge 714 is found three pixels to the right of the crosshairs 704.

Next, at block 610, the autonomous backing module 316 uses locations of the left edge 716 and the right edge 714 within the image to find the distance to the left edge and the right edge in a depth map 705 corresponding to the image. Once the locations within the depth map are determined, the depths indicated in the depth map can be used to find the distance to the left edge and the right edge. For example, the depth map 705 indicates that the left edge 720 is "14" units away, while the right edge 722 is "16" units away.

In some embodiments, the detected edges 716, 714 may be cross-referenced against information from a depth map in order to determine whether the detected edges indicate corners of the selected object. FIG. 7 also illustrates a portion of a depth map 705 that corresponds to the edge map 703. The depth map 705 corresponds to the pixels of the edge map 703 within the illustrated call-out box, and corresponds to the portion of the image 702 that includes the front surface of the trailer. The values in the pixels of the depth map 705 indicate a distance measured between the depth sensor and the detected object In embodiments in which the edge information is cross-referenced with the depth map information, the depth discontinuity on either side of the edge (e.g., going from 16 to 14 on either side of the location 720 that corresponds to the left edge 716, and going from 16 to 30 on either side of the location 722 that corresponds to the right edge 714. These depth discontinuities help confirm that the left edge and right edge of the trailer have been detected. In some embodiments, information from only the depth map 705 or only the edge map 703 may be used to confirm the location of the left edge and right edge.

At block 612, the autonomous backing module 316 uses the locations of the left edge and the right edge within the image to determine an orientation of a longitudinal vehicle axis with respect to the object. For example, FIG. 7 shows a distance 724 between a left side of the image and the left edge 706 of the trailer. Assuming that a center of the field of view of the sensor 202, 204 is aligned with the longitudinal axis of the vehicle 102, the distance 724 corresponds to an angle between the longitudinal axis of the vehicle 102 and the left edge 706 of the trailer. In some embodiments, angles to both the left edge and the right edge may be determined. In some embodiments, an average angle to the left edge and the right edge may be determined in order to determine an angle to the midline of the trailer. The orientation of the longitudinal axis of the vehicle 102 with respect to the trailer 104 is illustrated as angle 512 in FIG. 5.

At block 614, the autonomous backing module 316 uses the locations of the left edge and the right edge within the image and the distances to the left edge and the right edge to determine a distance to the object. In other words, the autonomous backing module 316 may determine how far the vehicle 102 is from the object, or where the vehicle 102 is located in the coordinate system centered at the front surface of the trailer, using these values.

At optional block 616, the autonomous backing module 316 uses the distance to the left edge and the right edge to determine an orientation of a longitudinal axis of the object with respect to the vehicle. Optional block 616 is considered optional because, in some embodiments, the orientation of the object may not be relevant to the path, and instead the path may be planned directly to the object without regard to also aligning the axes of the vehicle 102 and the object upon arrival. In FIG. 5, the angle 510 represents the orientation of the longitudinal axis of the trailer 104 with respect to the vehicle 102.

The procedure 600 then proceeds to an exit block and terminates, returning the orientation of the vehicle 102 with respect to the object, the distances to the object, and (optionally) the orientation of the longitudinal axis of the object as a result of the procedure 600.

Figure 8A:
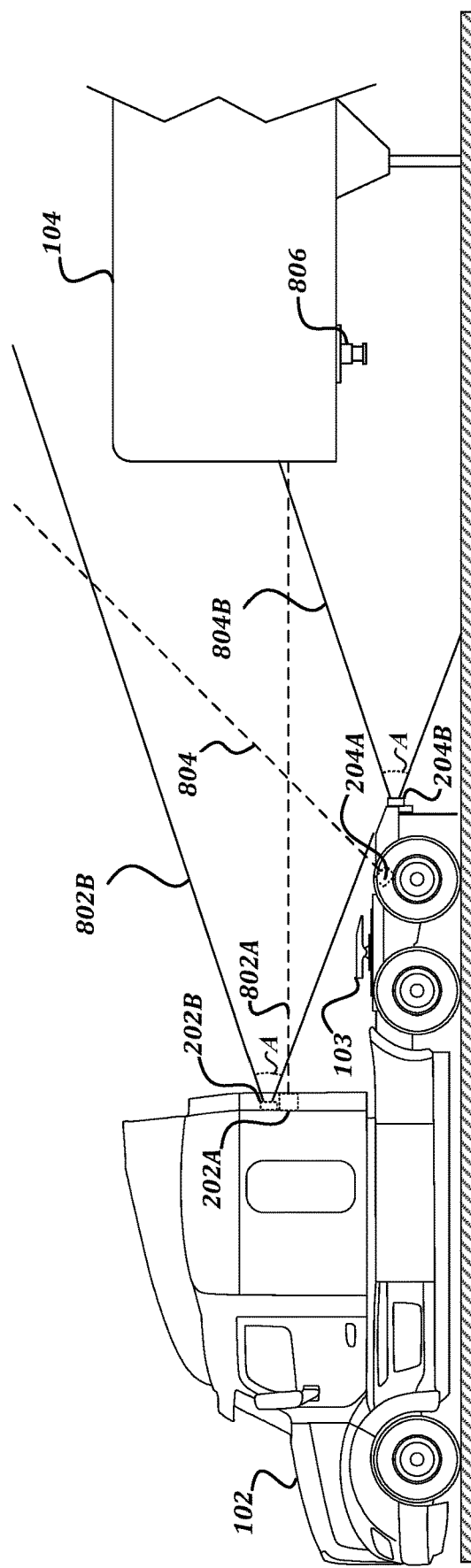
FIGS. 8A-8C are side views of an example embodiment of a vehicle (e.g., a tractor unit) approaching a trailer according to various aspects of the present disclosure.
Figure 8B:
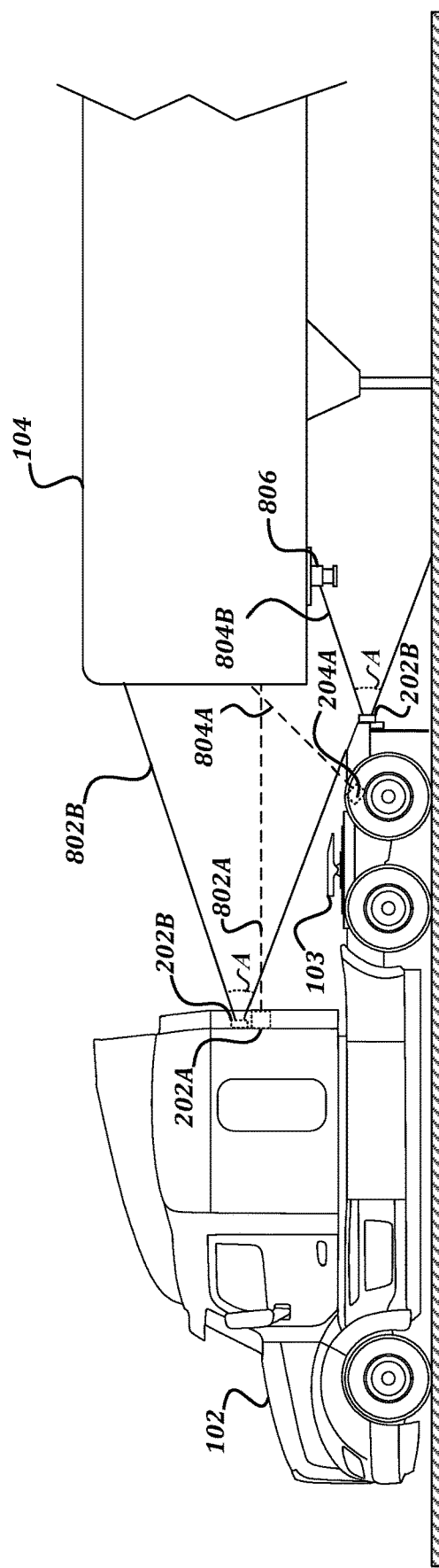
Figure 8C:
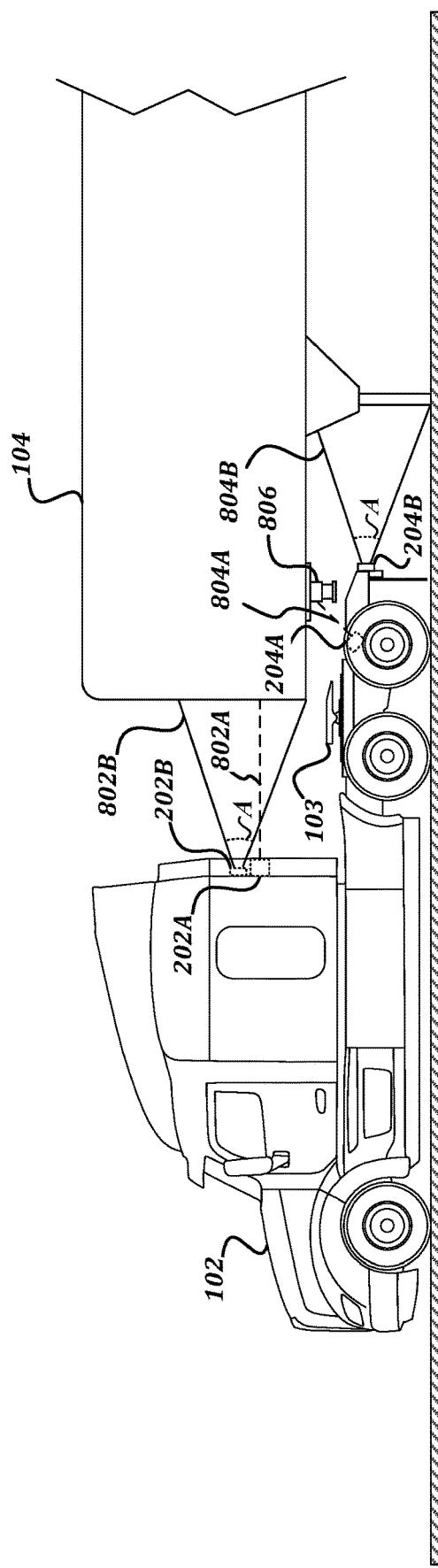

FIGS. 8A-8C are side views of an example embodiment of a vehicle (e.g., a tractor unit) approaching a trailer according to various aspects of the present disclosure. As shown, the vehicle 102 backs to a trailer 104 comprising a kingpin 806 to facilitate coupling the fifth wheel 103 of the vehicle to the kingpin. As shown, the fifth wheel 103 has a horseshoe shape configured to receive the kingpin during coupling. The fifth wheel 103 may remain in a fixed position during operation, or it may be adjustable (e.g., by pivoting or tilting). The vehicle 102 includes a set of upper environment sensors 202 (e.g., upper stereo camera sensor 202B and upper lidar sensor 202B) as well as a set of lower environment sensors 204 (e.g., lower stereo camera sensor 204B and lower lidar sensor 204A). However, it should be understood from the present description that the upper and lower sets of environment sensors need not include multiple sensors, e.g., in situations where redundant measurements are not required.

The sets of environment sensors may be used together or independently, depending on factors such as the distance of the vehicle 102 from the target. In one implementation, the upper environment sensors 202 are positioned to provide longer-range views of the trailer 104, and corresponding determinations of distance and orientation, whereas the lower environment sensors 204 are positioned to provide shorter-range views of the trailer 104 or features of lower portions of the trailer, such as the kingpin 806. These sets of sensors may be used in combination to provide confirmation of measurements, or the sets of sensors may be selectively used for different types of autonomous vehicle movements, as described in further detail below.

FIGS. 9A-9C are a flowchart that illustrates an example embodiment of a method of autonomously maneuvering a vehicle using environment sensors mounted at different locations on the vehicle according to various aspects of the present disclosure. From a start block, the method 900 proceeds to blocks 902, 904, 906 to determine if the vehicle 102 is ready for maneuvering and takes appropriate steps, as described above with reference to steps 402, 404, 406 in FIG. 4A. If the vehicle state information indicates that the vehicle 102 is ready for maneuvering at block 904, the method 900 proceeds to block 908. At block 908, the autonomous control module 315 calculates first coordinate data based on information (e.g., depth information or distance values) received from a first set of one or more environment sensors (e.g., upper environment sensors 202) mounted on a first portion of the vehicle 102 (e.g., an upper portion of the rear of the vehicle, such as the cab portion as shown in FIGS. 8A-8C). At block 910, the autonomous control module 315 determines, based at least in part on the first coordinate data, a first target at a first location. For example, the autonomous control module 315 may detect the front surface of a trailer 104 using techniques described herein, and set the target at that location. Next, at block 912, the autonomous control module 315 determines a first path to maneuver the vehicle 102 to the first location (e.g., using techniques described herein). The method 900 then proceeds to a continuation terminal ("terminal C").

From terminal C (FIG. 9B), the method 900 proceeds to blocks 914, 916, 918, 920 to determine if the vehicle 102 can safely maneuver toward the target and takes appropriate steps, which may be similar to steps described above with reference to FIG. 4A. If the vehicle 102 can safely back toward the trailer 104, the method 900 proceeds to procedure block 922. At procedure block 922, the autonomous control module 315 determines first commands to components of the vehicle 102 to autonomously control the vehicle to maneuver it along the determined path to the first location (e.g., using techniques described herein). At procedure block 924, the autonomous control module 315 transmits those commands to the components of the vehicle 102 (e.g., using techniques described herein), which cause the vehicle to move along the determined path.

At decision block 926, a determination is made regarding whether the vehicle 102 has arrived at the first target. For example, the autonomous control module 315 may determine that the rear of the vehicle 102 has arrived within a predetermined distance of the front surface of a trailer 104. The arrival determination may cause the autonomous control module 315 to select a different set of sensors for further maneuvering, as described in detail below.

If it is determined that the vehicle 102 has arrived at the trailer 104, method 900 proceeds to a continuation terminal ("terminal D"). Otherwise, the method 900 returns to block 914 to continue safely maneuvering along the path to the first location.

From terminal D (FIG. 9C), the method 900 proceeds with a second stage of the maneuver in which the autonomous control module obtains and acts upon information received from a second set of environmental sensors. Specifically, at block 928, the autonomous control module 315 calculates second coordinate data based on information (e.g., distance values) received from a second set of one or more environment sensors (e.g., lower environment sensors 204) mounted on a different portion of the vehicle 102 (e.g., a lower portion of the rear of the vehicle as shown in FIGS. 8A-8C). At block 930, the autonomous control module 315 determines, based at least in part on the second coordinate data, a second target (e.g., the kingpin 806 of a trailer 104) at a second location. Next, at block 932, the autonomous control module 315 determines a path to maneuver the vehicle 102 to the second location (e.g., using techniques described herein). At procedure block 934, the autonomous control module 315 determines second commands to components of the vehicle 102 to autonomously control the vehicle to maneuver it along the determined path to the second location (e.g., using techniques described herein). At procedure block 936, the autonomous control module 315 transmits those commands to the components of the vehicle 102 (e.g., using techniques described herein), which cause the vehicle to move along the determined path.

At decision block 938, a determination is made regarding whether the vehicle 102 has arrived at the second target. For example, the autonomous control module 315 may determine that the fifth wheel 103 of the vehicle 102 has arrived within a predetermined distance of the kingpin 806 of a trailer 104. If it is determined that the vehicle 102 has arrived at the second location, method 900 proceeds to an end block and terminates. Otherwise, the method 900 returns to block 928 to continue safely maneuvering along the path to the second location.

Referring again to the example shown in FIGS. 8A-8C, the upper stereo camera 202B obtains image information with a field of view 802B that has a vertical angle (labeled A) and a horizontal angle (not shown in this view) to obtain depth information as described above. This information can be used to determine a distance to and orientation of the front surface of the trailer 104, as described above. These determinations can be confirmed, as may be desired or required by regulation, by other sensors, such as the upper lidar sensor 202A.

Lidar technology uses lasers to emit laser light pulses and detect returns (e.g., via backscattering) of those pulses as they interact with objects or substances. Lidar has many applications, such as range-finding and terrain mapping, that involve detecting reflections from opaque objects or materials. Because the speed of light is a known constant, the time that elapses between a pulse and a corresponding return can be used to calculate the distance between the sensor and an object or substance. Because the position and orientation of the lidar sensor is also known, the values obtained by the lidar sensor can be provided as input to algorithms employing trigonometric functions to detect the position and shape of objects.

Lidar sensors described herein include may include one or more laser scanners that emit laser pulses from the vehicle and detect the timing and potentially other characteristics (such as angle) of the returns of those pulses. The number of pulses and returns may vary depending on implementation, such that different sampling rates are possible. For example, measurements may be taken at a rate of 1 Hz to 100 Hz, e.g., 20 Hz. Further, the geometry of such pulses (e.g., 2D scanning, 3D scanning, or some combination) may vary depending on the type of sensors used.

Referring again to the example shown in FIGS. 8A-8C, the lidar sensors 202A, 204A are 2D horizontal sweeping lidar sensors. The upper lidar sensor 202A is oriented such that the laser pulses 802A are emitted in a plane that is substantially parallel (e.g., within 5 degrees) to the longitudinal axis of the vehicle, whereas the lower lidar sensor 204A is oriented at an upward angle (e.g., 45 degrees from horizontal). This upward angle allows the lidar sensor 204A to obtain measurements in two dimensions (e.g., the X-Y plane). This arrangement is useful for, e.g., detecting the elevation of the trailer 104 or kingpin 806 (Z-dimension measurements), as well as the distance of the kingpin 806 from the front surface of the trailer 104 (X-dimension measurements).

Figure 10A:
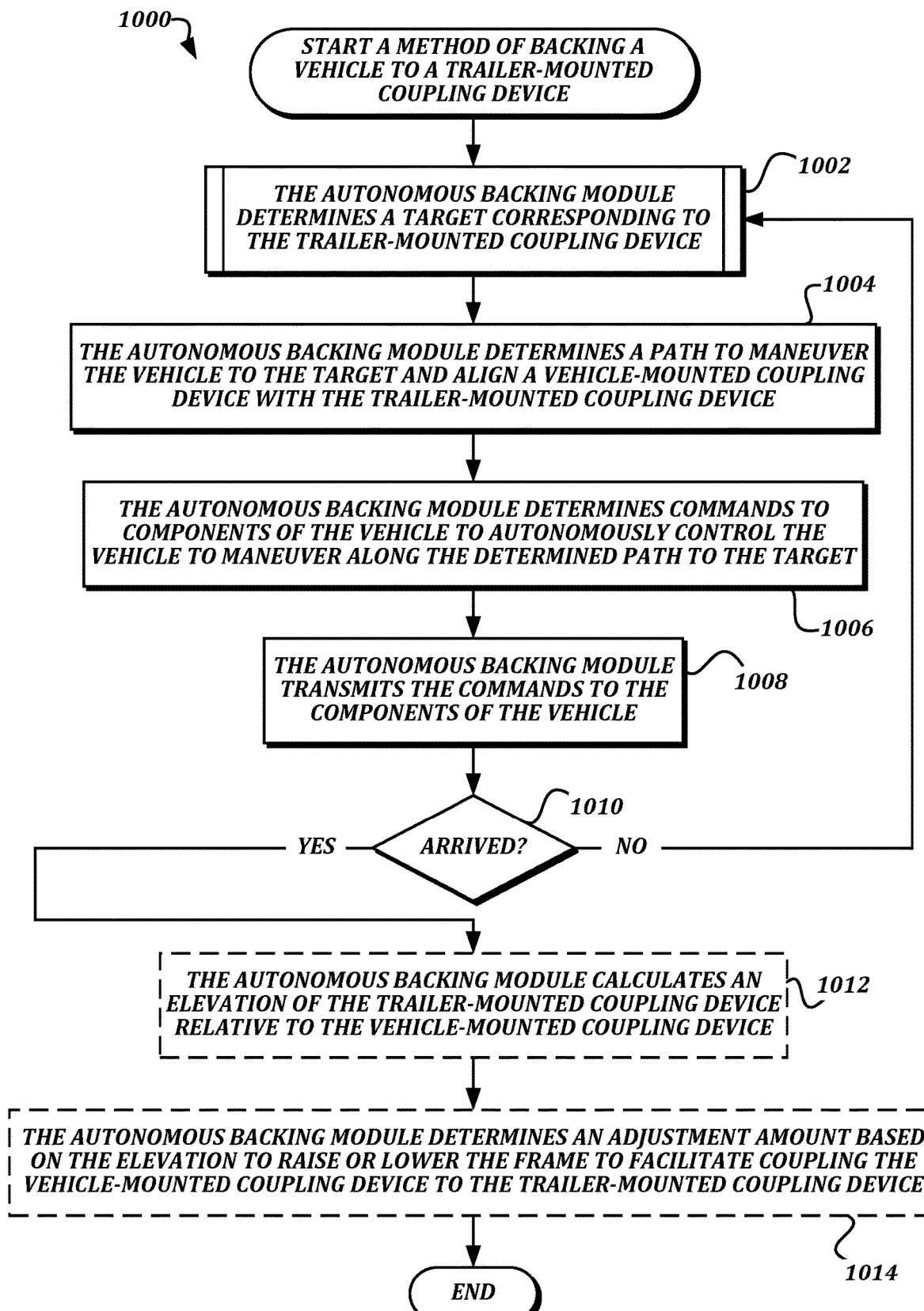
FIG. 10A is a flowchart that illustrates an example embodiment of a method of backing a vehicle comprising a vehicle-mounted coupling device (e.g., a fifth wheel) to a corresponding trailer-mounted coupling device (e.g., a kingpin) according to various aspects of the present disclosure.

FIG. 10A is a flowchart that illustrates an example embodiment of a method of backing a vehicle 102 comprising a vehicle-mounted coupling device (e.g., a fifth wheel) to a corresponding trailer-mounted coupling device (e.g., a kingpin) according to various aspects of the present disclosure. Although examples described herein are directed to a Class 8 tractor-trailer combination in which a fifth wheel of the tractor unit couples to a kingpin of a semi-trailer, these examples are also applicable to other types of vehicle-trailer combinations, such as a flatbed truck or pickup truck with a fifth wheel coupling to a kingpin mounted on a recreational trailer. Furthermore, these examples are also applicable to vehicles and trailers that employ different types of coupling devices, such as a hitch with a tow ball coupling to an A-frame coupler or gooseneck mount of a trailer, a tow hook coupling to a trailer loop, or a lunette ring coupling to a pintle hook.

From a start block, the method 1000 proceeds to procedure block 1002, where a procedure is performed wherein the autonomous backing module 316 determines a target corresponding to the trailer-mounted coupling device. Any suitable procedure may be used in procedure block 1002, one example of which is illustrated in FIG. 10B.

Once the target has been determined, at block 1004 the autonomous backing module 316 determines a path to maneuver the vehicle 102 to the target (e.g., using techniques described herein) and align the vehicle-mounted coupling device with the trailer-mounted coupling device. If necessary, the method 1000 may include safety checks to determine if the vehicle 102 can safely maneuver toward the target (see, e.g., FIG. 4A). The method 900 then proceeds to block 1006, where the autonomous backing module 316 determines commands to components of the vehicle 102 to autonomously control the vehicle to maneuver it along the determined path to the target. At block 1008, the autonomous backing module 316 transmits those commands to the components of the vehicle 102, which causes the vehicle to back towards the target.

At decision block 1010, the autonomous backing module 316 determines whether the vehicle 102 has arrived at the target. For example, the autonomous backing module 316 may determine that the vehicle-mounted coupling device has arrived within a predetermined distance of the trailer-mounted coupling device. The arrival determination may cause the autonomous backing module 316 to make additional calculations or adjustments, such as where vertical adjustments may be necessary to vertically align a fifth wheel with a kingpin for coupling. In this situation, the method 1000 may proceed to optional block 1012 in which the autonomous backing module 316 calculates an elevation of the trailer-mounted coupling device relative to the vehicle-mounted coupling device. The method 1000 may then proceed to optional block 1014 in which the autonomous backing module 316 determines an adjustment amount, based on the calculated elevation, to raise or lower the frame (e.g., using adjustable suspension module 308) of the vehicle 102 to facilitate proper coupling. The autonomous backing module 316 may then transmit commands to the adjustable suspension module 308 to raise or lower the frame by the adjustment amount. Blocks 1012 and 1014 are illustrated as optional because in some embodiments, elevation or height adjustments may not be needed to successfully couple the vehicle-mounted coupling device and the trailer-mounted coupling device. The method 1000 then proceeds to an end block and terminates.

Figure 10B:
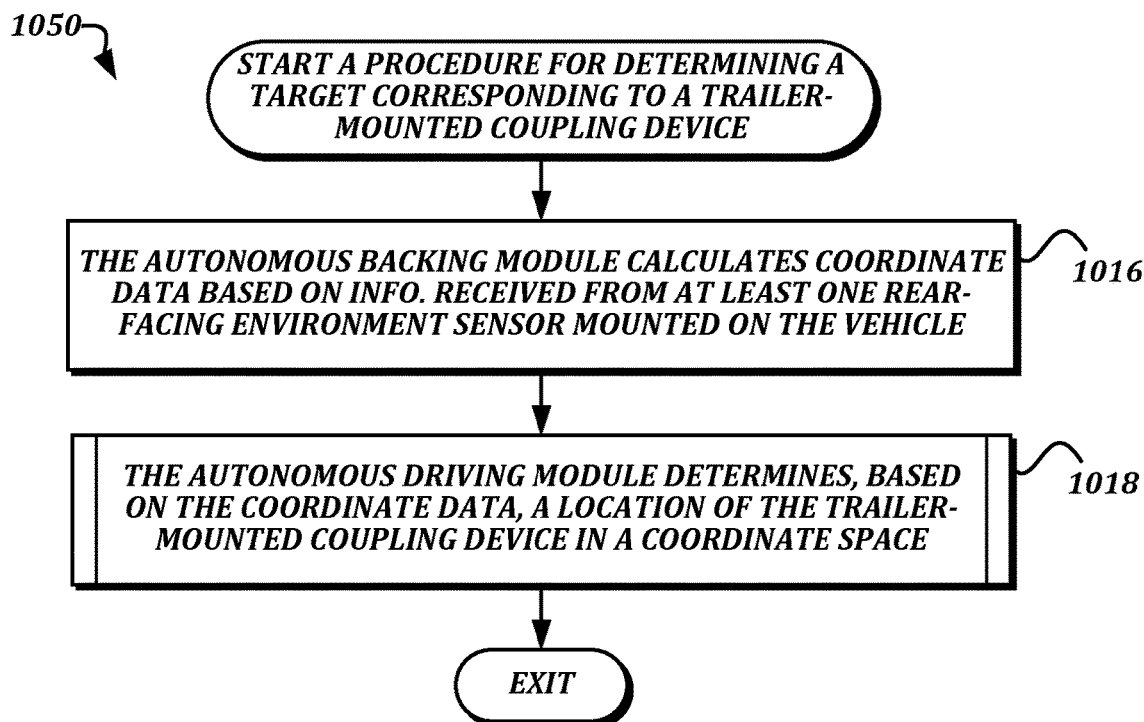
FIG. 10B is a flowchart of an example embodiment of a procedure for determining a target corresponding to a trailer-mounted coupling device according to various aspects of the present disclosure.

FIG. 10B is a flowchart of an example embodiment of a procedure for determining a target corresponding to a trailer-mounted coupling device according to various aspects of the present disclosure. The procedure 1050 is an example of a procedure suitable for use in procedure block 1002 of FIG. 10A. From a start block, the procedure 1050 advances to block 1016, where the autonomous backing module 316 calculates coordinate data based on information (e.g., distance values) received from at least one rear-facing environment sensor (e.g., lidar sensor 204A) mounted to the vehicle 102 (e.g., a lower portion of the rear of the vehicle, such as a cross member between the frame rails as shown in FIG. 2C). At procedure block 1018, a procedure is conducted wherein the autonomous backing module 316 determines, based on the coordinate data, a location of the trailer-mounted coupling device (e.g., kingpin 806) in a coordinate space. Any suitable procedure may be used at procedure block 1018, such as the example procedure 1060 illustrated in FIG. 10C for when the trailer-mounted coupling device is a kingpin. The procedure 1050 then proceeds to an exit block and terminates.

Figure 10C:
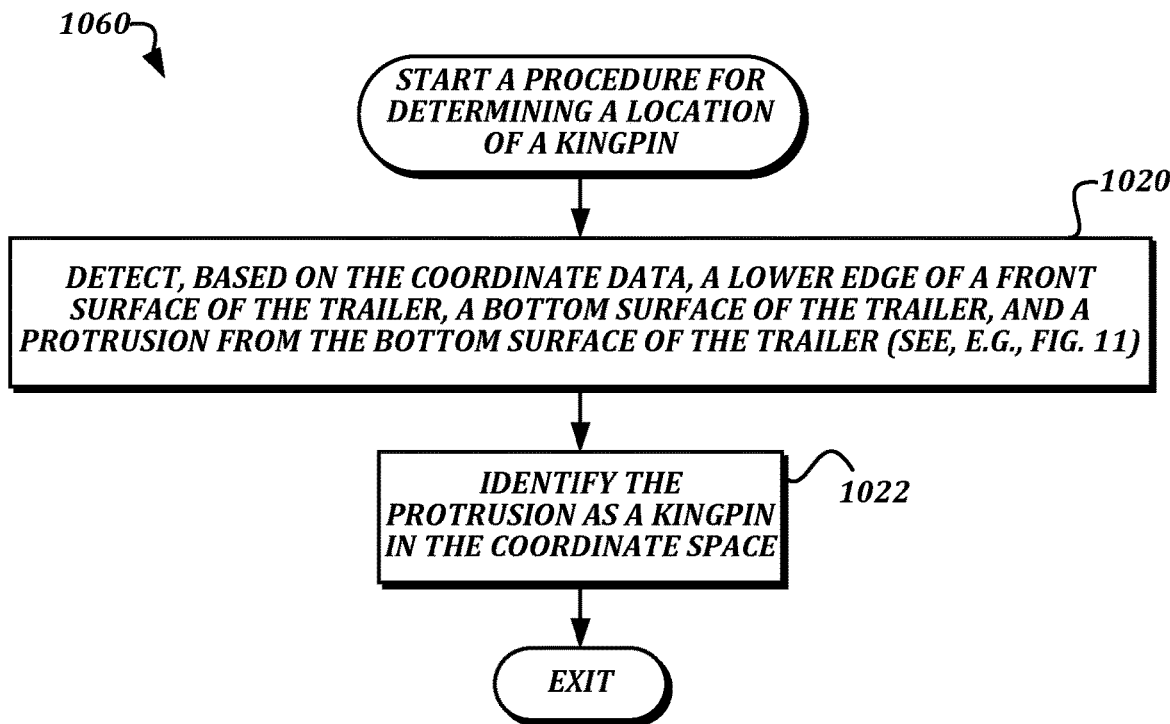
FIG. 10C is a flowchart that illustrates an example embodiment of a procedure for determining a location of a kingpin according to various aspects of the present disclosure.

FIG. 10C 1s a flowchart that illustrates an example embodiment of a procedure for determining a location of a kingpin according to various aspects of the present disclosure. The procedure 1060 is an example of a procedure suitable for use at procedure block 1018 of FIG. 10B. From a start block, the procedure 1060 advances to block 1020, where the autonomous backing module 316 detects features of the trailer 104 to help it identify the kingpin 806. Specifically, block 1020 specifies detection of a lower edge of a front surface of the trailer 104, a bottom surface of the trailer, and a protrusion from the bottom surface of the trailer. At block 1022, the autonomous backing module 316 identifies the protrusion as the kingpin in the coordinate space. To accomplish this, the autonomous backing module 316 may compare the data associated with the detected protrusion with models of one or more typical kingpins, which may be stored in the autonomous backing module. Alternatively, if the dimensions and location of the kingpin on a particular trailer are already known (e.g., based on prior measurements), the autonomous backing module 316 may calculate the location and orientation of the kingpin in a particular backing maneuver based on the location and orientation of the front surface of the trailer. In this situation, the kingpin need not be detected separately, though doing so may serve as a check on the accuracy of the previous measurements. The procedure 1060 then advances to an exit block and terminates.

Figures 11A, 11B:
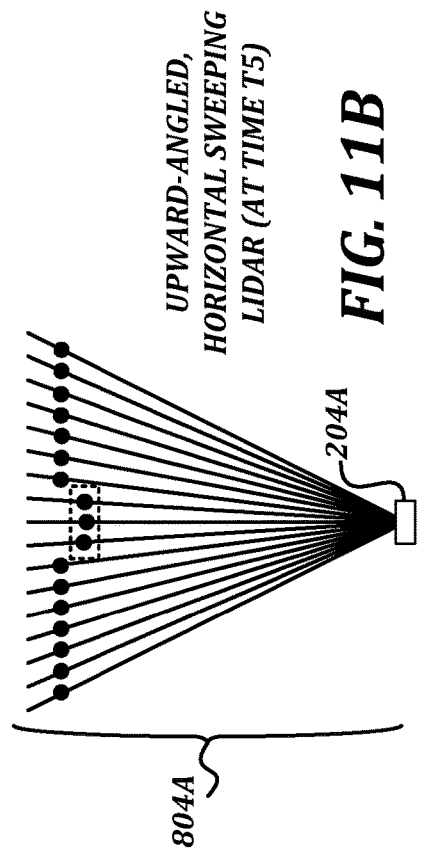
FIGS. 11A and 11B illustrate example scanning techniques employed by an example embodiment of a lidar sensor that may be used in the method described in FIGS. 10A-10C, or other methods described herein, to obtain information that may be used to calculate coordinate data for detecting the location and orientation of objects such as trailer surfaces and kingpins according to various aspects of the present disclosure.

FIGS. 11A and 11B illustrate example scanning techniques employed by an example embodiment of a lidar sensor (e.g., lidar sensor 204A) that may be used in the method described in FIGS. 10A-10C, or other methods described herein, to obtain information that may be used to calculate coordinate data for detecting the location and orientation of objects such as trailer surfaces and kingpins. In the example shown in FIGS. 11A and 11B, the lidar sensor 204A is a horizontal sweeping lidar sensor that is oriented at an upward angle and emits laser pulses 804A in a plane oriented along the upward angle (e.g., as shown in FIGS. 8A-8C). The lidar sensor 204A emits these pulses periodically; a sampling of illustrative distance values obtained at times T1-T5 is shown in FIG. 11A.

At time T1, the lidar sensor 204A is scanning the front surface of the trailer 104 as the vehicle 102 backs to the kingpin 806. Here, the distance values are consistent with a generally flat surface. As the vehicle 102 continues to back to the kingpin 806, the distance between the lidar sensor 204A and the front surface gets smaller until the point at which the lidar sensor is scanning the corner between the front surface and the bottom surface of the trailer 104 at time T2. At this point, if the bottom surface is flat and parallel to the direction of travel, the distance between the lidar sensor 204A and the bottom surface will at first remain constant as the vehicle 102 continues to back to the kingpin 806 at time T3. However, as the vehicle 102 backs further, at times T4 and T5, the lidar sensor 204A will detect a protrusion from the bottom surface (the kingpin 806), resulting in smaller distance values near the center of the surface. This "bump" in the distance values is also represented graphically in FIG. 11B, with the dots on the rays representing reflection points of the laser pulses. In FIGS. 11A and 11B, the signals associated with the detected kingpin 806 are indicated by the dashed rectangles.

Based on this data, as well as the known location and orientation of the lidar sensor 204A mounted on the vehicle 102, the autonomous backing module 316 can calculate the location and elevation of the trailer 104 and the kingpin 806 relative to the fifth wheel 103. This allows the autonomous backing module 316 to calculate the path the vehicle must follow to align the fifth wheel 103 with the kingpin 806 in the X-Y plane, and to calculate any vertical adjustments to the frame of the vehicle that may be needed to align the coupling devices in the Z dimension for proper coupling. When calculating such paths, the position of the fifth wheel 103 may be programmed into the autonomous backing module 316 or detected (e.g., using upper stereo camera sensor 202B).

Figure 12:
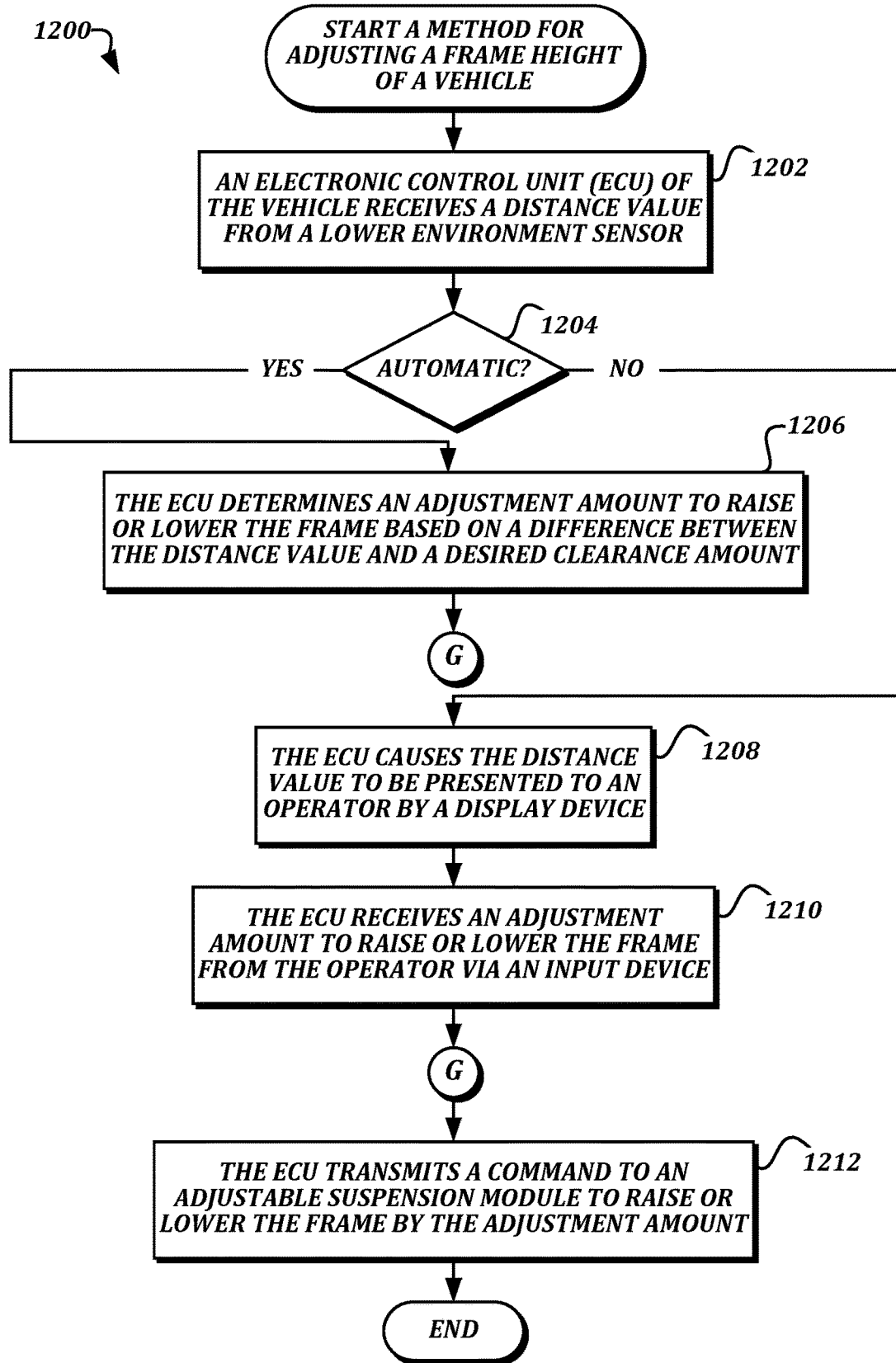
FIG. 12 is a flowchart that illustrates an example embodiment of a method for adjusting a frame height of a vehicle according to various aspects of the present disclosure.

The configuration of the lower environment sensors 204 described above that includes an angled depth sensor installed on a lower portion of the vehicle 102 may have uses beyond contributing to an autonomous driving task. The ability to detect a height of an object above a portion of the vehicle 102 as illustrated in FIGS. 11A-11B and described above can be useful even without autonomous steering or driving. FIG. 12 is a flowchart that illustrates an example embodiment of a method for adjusting a frame height of a vehicle according to various aspects of the present disclosure. From a start block, the method 1200 proceeds to block 1202, where an electronic control unit 314 of the vehicle 102 receives a distance value from a lower environment sensor 204. For the purposes of the method 1200, it is assumed that the distance value represents a height of an object detected by the lower environment sensor 204, as illustrated in FIG. 8C. In some embodiments, the validity of this assumption could be ensured by not starting the method 1200 until this state is present. In some embodiments, the electronic control unit 314 could monitor values from lower environment sensor 204 and detect when the state is likely (for example, when distances are falling and then sharply level off, such as a transition from sensing a front surface of a trailer to sensing the undercarriage of the trailer), and then starting the method 1200 then.

Next, at decision block 1204, a determination is made regarding whether the frame height of the vehicle 102 is to be adjusted automatically or manually. In some embodiments, the determination may be made based on a configuration of the vehicle 102 made by the operator. In some embodiments, the determination m a y be made based on whether the environment sensors 202, 204 can verify to an acceptable likelihood whether safe conditions exist for automatic adjustment, and/or whether the data received from the lower environment sensor 204 is reliable.

If the determination at decision block 1204 is that the frame height should be adjusted automatically, then the result of decision block 1204 is YES, and the method 1200 proceeds to block 1206. At block 1206, the ECU 314 determines an adjustment amount to raise or lower the frame based on a difference between the distance value and a desired clearance amount. In some embodiments, the desired clearance amount may be configured in the vehicle 102 such that the fifth wheel of the vehicle 102 is at an appropriate height to mate with a kingpin of a trailer. In some embodiments, the desired clearance amount may be configured in the vehicle 102 for other purposes, including but not limited to aligning a portion of the vehicle 102 with an edge of a dock, or maintaining an adequate safety clearance for components of the vehicle 102. The method 1200 then proceeds to a continuation terminal ("terminal G").

Returning to decision block 1204, if the determination is that the frame height should not be adjusted automatically, then the result of decision block 1204 is NO, and the method 1200 proceeds to block 1208. At block 1208, the ECU 314 causes the distance value to be presented to an operator by a display device. The display device may be the operator interface device 302 or any other device within the vehicle 102, including but not limited to a multi-function dashboard display. Next, at block 1210, the ECU 314 receives an adjustment amount to raise or lower the frame from the operator via an input device. As with the display device, the input device may be the operator interface device 302, or any other device within the vehicle 102 capable of receiving the input from the operator, including but not limited to a dial, a button, or a slider.

The method 1200 then proceeds to terminal G, and then to block 1212, where the ECU 314 transmits a command to an adjustable suspension module 308 to raise or lower the frame by the adjustment amount. In some embodiments, the command may specify the adjustment amount as a relative distance from a current setting, or as an absolute distance from the ground (or other reference point). In some embodiments, the ECU 314 may translate the adjustment amount (which may be in a unit of distance measurement) into a pressure value or a value of another data type accepted by the adjustable suspension module 308, and may transmit the translated value to the adjustable suspension module 308. In some embodiments, the adjustable suspension module 308 then actuates the physical components of the vehicle 102 to implement the command.

The method 1200 then proceeds to an end block and terminates.

Several of the methods described above use a model of the turning dynamics of the vehicle 102 to confirm that a calculated path will be traversable by the vehicle 102, and to determine appropriate control actions to cause the vehicle 102 to turn along the path. Modeling turning dynamics is a common task, and once the vehicle parameters that affect turning dynamics (including but not limited to the wheelbase length, the axle track width, the scrub radius, the toe-in configuration, the tire size, the tire material, the tire pressure, and the maximum steer angle) are known, the turning performance of the vehicle 102 can be predicted for a given control input with a high degree of accuracy. However, the vehicle parameters are not always initially known. For example, the electronic control unit 314 may be mass produced and programmed during production, and may not subsequently be reprogrammed with the vehicle parameters of the specific vehicle in which it is installed. As another example, vehicle parameters that affect the turning dynamics, such as the tire pressure or toe-in configuration, may change over time. What is desirable are techniques that can learn the model of the turning dynamics of the vehicle 102, without pre-knowledge of the vehicle parameters.

Figure 13:
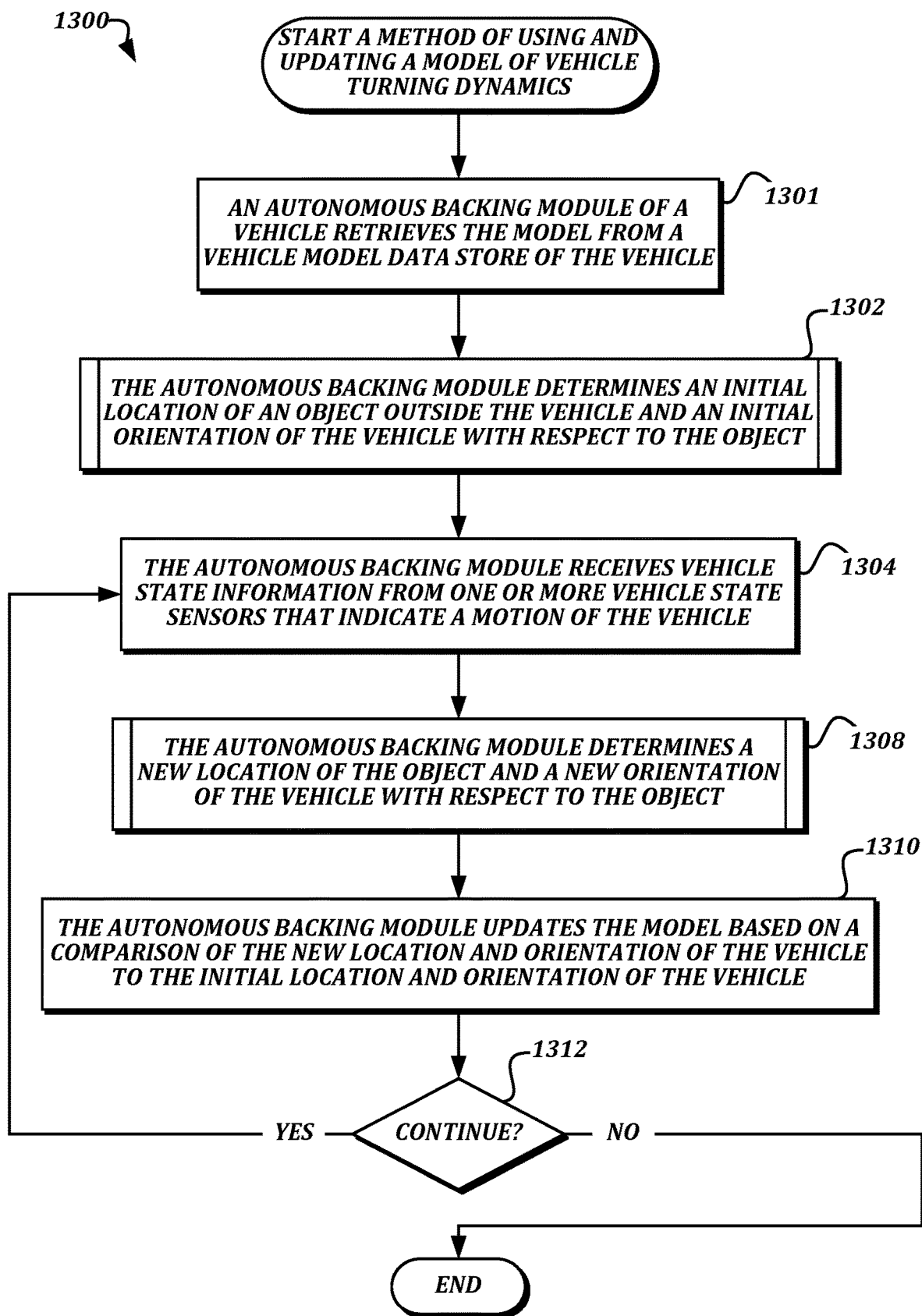
FIG. 13 is a flowchart that illustrates an example embodiment of a method of using and updating a model of vehicle turning dynamics according to various aspects of the present disclosure.

FIG. 13 is a flowchart that illustrates an example embodiment of a method of using and updating a model of vehicle turning dynamics according to various aspects of the present disclosure. In general, the method 1300 monitors the motion of the vehicle 102 while it is moving, and uses the motion of the vehicle to derive the model for the turning dynamics of the vehicle by associating the motion generated to the vehicle state that caused the motion. In some embodiments, the method 1300 may be performed while the vehicle 102 is turning through a fixed curve (in other words, while the vehicle 102 is traveling through a turn with an unchanging steering angle). In some embodiments, the method 1300 may be operating quickly enough to ignore changes in the steering angle between measurements. In some embodiments, the method 1300 may take into account changes in the steering angle over time. In some embodiments, the method 1300 may operate during other vehicle operations to continue to refine the model, such as during a manual backing procedure or during an autonomous backing procedure. In some embodiments, the method 1300 may be executed during multiple manual backing procedures that are performed from a variety of distances and a variety of angles from a trailer in order to provide training information for the method 1300.

From a start block, the method 1300 proceeds to block 1301, where an autonomous backing module 316 of a vehicle 102 retrieves the model from a vehicle model data store 318 of the vehicle 102. In some embodiments, the retrieved model may be a default model that includes rough values determined during initial configuration of the vehicle 102 or manufacture of the ECU 314. In some embodiments, the retrieved model may have previously been updated with the procedure 1300, and is being further updated. In some embodiments, the retrieved model may begin as a default model that includes default values regardless of the specifications of the vehicle 102.

Next, at procedure block 1302, the autonomous backing module 316 determines a location of an object outside the vehicle and an orientation of the vehicle with respect to the object. In some embodiments, the autonomous backing module 316 uses a procedure such as the procedure 600 described above to determine a location of the object and the orientation of the vehicle 102 with respect to the object. In some embodiments, the object may be any object that can be detected by procedure 600, including but not limited to a surface of a trailer, a building, another vehicle, a decal, a painted line, or any other object. In some embodiments, the object may be selected by the operator using the operator interface device 302 as described above. In some embodiments, the object may be automatically selected by the autonomous backing module 316, because the particular chosen object is not material to the method 1300 because it does not serve as a target of a path. In some embodiments, the return values of the procedure called in procedure block 1302 include the coordinates of the object (or the vehicle 102) in a coordinate system and an orientation of the vehicle 102 with respect to the object or the coordinate system.

Next, at block 1304, the autonomous backing module 316 receives vehicle state information from one or more vehicle state sensors 304 that indicate a motion of the vehicle. Typically, the vehicle state information that indicates a motion of the vehicle includes a steering angle and a wheel speed. In some embodiments, the vehicle state information may include any other information from any combination of vehicle state sensors that allow the method 1300 to determine relevant control inputs being applied and a rate at which the vehicle 102 is moving.

At procedure block 1308, the autonomous backing module 316 determines a new location of the object and a new orientation of the vehicle 102 with respect to the object. This procedure block 1308 is similar to procedure block 1302, at least in that a procedure such as procedure 600 may be used, and it may return the coordinates of the object (or the vehicle 102) in a coordinate system and an orientation of the vehicle 102 with respect to the object or the coordinate system. The primary difference between procedure block 1308 and procedure block 1302 is that instead of choosing an object to detect or receiving a selection of an object to detect, the procedure block 1308 reuses the object detected by procedure block 1302.

Next, at block 1310, the autonomous backing module 316 updates the model based on a comparison of the new location and orientation of the vehicle 102 to the initial location and orientation of the vehicle 102. The autonomous backing module 316 uses this comparison to determine a translation and a rotation of the vehicle 102 in the coordinate system, and uses the vehicle state information as known values in the model to solve for various unknown values (including but not limited to wheelbase length, axle track width, scrub radius, tire pressure, and toe-in setting). The updated model may be stored in the vehicle model data store 318.

The method 1300 then proceeds to a decision block 1312, where a determination is made regarding whether to continue. In some embodiments, the determination may be based on whether significant changes were made to the model at block 1310, or whether the model remained essentially the same. If no significant changes were made, the model may already accurately reflect the turning dynamics of the vehicle 102, and further refinements may not be necessary. In some embodiments, the determination may be based on whether the method 1300 has been executed for a predetermined amount of time, or for a predetermined number of loops. In some embodiments, the determination may be made based on whether an object is currently selected within another method being concurrently executed by the vehicle 102, such as one of the autonomous control methods described above.

If the determination at decision block 1312 finds that the method 1300 should continue, then the result of decision block 1312 is YES, and the method 1300 returns to block 1304. Otherwise, if the determination at decision block 1312 finds that no further changes to the model are desired, then the result of decision block 1312 is NO, and the method 1312 proceeds to an end block and terminates. The description above describes the method 1300 as being performed by the autonomous backing module 316, but in some embodiments, the method 1300 could be performed by another component of the vehicle 102, such as the autonomous driving module 315 or another component of the ECU 314.

Many alternatives to the vehicles, systems, and methods described herein are possible. As an example, although some embodiments described herein relate to on-board vehicle computer systems, such embodiments may be extended to involve computer systems that are not on board a vehicle. A suitably equipped vehicle may communicate with other computer systems wirelessly, e.g., via a WiFi or cellular network. Such systems may provide remote data processing and storage services, remote diagnostics services, driver training or assistance, or other services that relate to embodiments described herein. In such an embodiment, aspects of the systems and methods described herein may be implemented in one or more computing devices that communicate with but are separate from, and potentially at a great distance from the vehicle. In such arrangements, models of vehicles, models of turning dynamics, and other information may be by downloaded from, uploaded to, stored in, and processed by remote computer systems in a cloud computing arrangement, which may allow vehicles to benefit from data obtained by other vehicles. As another example, aspects of the systems and related processes described herein transcend any particular type of vehicle and may be applied to vehicles employing an internal combustion engine (e.g., gas, diesel, etc.), hybrid drive train, or electric motor.

While illustrative embodiments have been illustrated and described, it will be appreciated that various changes can be made therein without departing from the spirit and scope of the invention.

The invention claimed is:

1. A method of autonomously backing a vehicle to a trailer, the method comprising:
   determining, by an autonomous backing module of the vehicle, a trailer to target in an image captured by a sensor positioned on the vehicle;
   determining, by the autonomous backing module, a distance to the trailer, an angle of an axis of the trailer, and an angle of an axis of the vehicle including:
      detecting, by the autonomous backing module, a left edge of a front surface of the trailer and a right edge of the front surface of the trailer in an edge map generated from the image;
      determining, by the autonomous backing module, a first distance from the vehicle to the left edge and a second distance from the vehicle to the right edge in a depth map generated from the image by cross-referencing locations in the edge map against information from the depth map, wherein cross-referencing locations in the edge map against information from the depth map includes identifying depth discontinuities in the depth map and verifying that locations of the depth discontinuities in the depth map correspond to locations of the left edge and the right edge detected on the edge map to confirm presence of one or more of the left edge or the right edge as detected from the edge map;
      determining, by the autonomous backing module, the angle of the axis of the trailer and the angle of the axis of the vehicle based on the first distance and the second distance;
   determining, by the autonomous backing module, a path to the trailer based on the distance to the trailer, the angle of the axis of the trailer, and the angle of the axis of the vehicle; and
   transmitting, by the autonomous backing module, one or more commands to components of the vehicle to autonomously control the vehicle to back along the determined path to the trailer.

2. The method of claim 1, wherein determining the trailer to target includes:
   presenting, by an operator interface device of the vehicle, an image captured by a first environment sensor mounted to a rear portion of the vehicle; and
   receiving, by the operator interface device, an input from an operator indicating a location within the image that corresponds to the front surface of the trailer to target.

3. The method of claim 1, wherein detecting the left edge of the front surface of the trailer comprises finding an edge to the left of the location indicated by the operator, and wherein detecting the right edge of the front surface of the trailer comprises finding an edge to the right of the location indicated by the operator.

4. The method of claim 1, wherein determining the path to the trailer includes:
   determining a result that is a multi-order polynomial function;
   wherein the function is defined in a Cartesian space having an origin at the center of the front surface of the trailer, and an X-axis parallel to an axis of the trailer; and
   wherein the function includes terms that represent:
      an X-Y position of a rear axle of the vehicle; and
      an X-Y position of a front axle of the vehicle.

5. The method of claim 1, wherein transmitting, by the autonomous backing module, one or more commands to components of the vehicle to autonomously control the vehicle to back along the determined path to the trailer includes:
   transmitting commands to one or more of a braking control module, a steering control module, and a torque request module.

6. The method of claim 1, wherein the vehicle is a Class 8 truck.

7. A vehicle configured to autonomously back to a trailer, the vehicle comprising:
   a braking control module for electronically controlling a brake system;
   a steering control module for electronically controlling a steering system;
   a torque request module for electronically causing the vehicle to produce a requested amount of torque; and
   an electronic control module (ECM) configured to:
      determine a trailer to target in an image captured by a sensor positioned on the vehicle;
      determine a distance to the trailer, an angle of an axis of the trailer, and an angle of an axis of the vehicle including:
         detecting a left edge of a front surface of the trailer and a right edge of the front surface of the trailer in an edge map generated from the image;
         determining a first distance from the vehicle to the left edge and a second distance from the vehicle to the right edge in a depth map generated from the image by cross-referencing locations in the edge map against information from the depth map, wherein cross-referencing locations in the edge map against information from the depth map includes identifying depth discontinuities in the depth map and verifying that locations of the depth discontinuities in the depth map correspond to locations of the left edge and the right edge detected on the edge map to confirm presence of one or more of the left edge or the right edge as detected from the edge map;

determining the angle of the axis of the trailer and the angle of the axis of the vehicle based on the first distance and the second distance;

determine a path to the trailer based on the distance to the trailer, the angle of the axis of the trailer, and the angle of the axis of the vehicle; and transmit one or more commands to the braking control module, the steering control module, and the torque request module to autonomously control the vehicle to back along the determined path to the trailer.

8. The vehicle of claim 7, further comprising an operator interface device and a first environment sensor, wherein the first environment sensor is mounted to a rear portion of the vehicle, and wherein determining a trailer to target includes;

presenting, by the operator interface device, an image captured by the first environment sensor; and receiving, by the operator interface device, an input from an operator indicating a location within the image that corresponds to the front surface of the trailer to target.

9. The vehicle of claim 8, wherein detecting the left edge of the front surface of the trailer comprises finding an edge to the left of the location indicated by the operator, and wherein detecting the right edge of the front surface of the trailer comprises finding an edge to the right of the location indicated by the operator.

10. The vehicle of claim 7, wherein determining the path to the trailer includes:

determining a result that is a third order polynomial function with a zeroth term missing and a first order term missing;

wherein the function is defined in a Cartesian space having an origin at the center of the front surface of the trailer, and an X-axis parallel to an axis of the trailer; and wherein the function includes terms that represent:
an X-Y position of a rear axle of the vehicle; and
an X-Y position of a front axle of the vehicle.

11. The vehicle of claim 7, wherein the vehicle is a Class 8 truck.

12. A non-transitory computer-readable medium having computer-executable instructions stored thereon that, in response to execution by an electronic control unit (ECU) of a vehicle, cause the vehicle to perform actions for autonomously backing to a trailer, the actions comprising:

determining, by the ECU, a trailer to target in an image captured by a sensor positioned on the vehicle;

determining, by the ECU, a distance to the trailer, an angle of an axis of the trailer, and an angle of an axis of the vehicle including:

detecting, by the ECU, a left edge of a front surface of the trailer and a right edge of the front surface of the trailer in an edge map generated from the image;

determining, by the ECU, a first distance from the vehicle to the left edge and a second distance from the vehicle to the right edge in a depth map generated from the image by cross-referencing locations in the edge map against information from the depth map, wherein cross-referencing locations in the edge map against information from the depth map includes identifying depth discontinuities in the depth map to and verifying that locations of the depth discontinuities in the depth map correspond to locations of the left edge and the right edge detected on the edge map confirm presence of one or more of the left edge or the right edge as detected from the edge map;

determining, by the ECU, the angle of the axis of the trailer and the angle of the axis of the vehicle based on the first distance and the second distance;

determining, by the ECU, a path to the trailer based on the distance to the trailer, the angle of the axis of the trailer, and the angle of the axis of the vehicle; and transmitting, by the ECU, one or more commands to components of the vehicle to autonomously control the vehicle to back along the determined path to the trailer.

13. The computer-readable medium of claim 12, wherein determining the trailer to target includes:

presenting, by an operator interface device of the vehicle, an image captured by a first environment sensor mounted to a rear portion of the vehicle; and receiving, by the operator interface device, an input from an operator indicating a location within the image that corresponds to the front surface of the trailer to target.

14. The computer-readable medium of claim 12, wherein detecting the left edge of the front surface of the trailer comprises finding an edge to the left of the location indicated by the operator, and wherein detecting the right edge of the front surface of the trailer comprises finding an edge to the right of the location indicated by the operator.

15. The computer-readable medium of claim 12, wherein determining the path to the trailer includes:

determining a result that is a third order polynomial function with a zeroth term missing and a first order term missing;

wherein the function is defined in a Cartesian space having an origin at the center of the front surface of the trailer, and an X-axis parallel to an axis of the trailer; and wherein the function includes terms that represent;
an X-Y position of a rear axle of the vehicle; and
an X-Y position of a front axle of the vehicle.

16. The computer-readable medium of claim 3, wherein transmitting, by the autonomous backing module, one or more commands to components of the vehicle to autonomously control the vehicle to back along the determined path to the trailer includes:

transmitting commands to one or more of a braking control module, a steering control module, and a torque request module.

17. The computer-readable medium of claim 12, wherein the vehicle is a Class 8 truck.

* * * * *